United States Patent
Sakamoto et al.

(10) Patent No.: US 7,006,278 B2
(45) Date of Patent: Feb. 28, 2006

(54) WAVELENGTH-DIVISION MULTIPLEXING OPTICAL TRANSMISSION SYSTEM AND REPEATER STATION THEREIN

(75) Inventors: Takeshi Sakamoto, Kawasaki (JP); Tetsuo Wada, Kawasaki (JP); Yoshinori Tochiki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 279 days.

(21) Appl. No.: 10/689,749

(22) Filed: Oct. 22, 2003

(65) Prior Publication Data
US 2004/0086279 A1    May 6, 2004

(30) Foreign Application Priority Data
Oct. 22, 2002    (JP)    ............................. 2002-306804

(51) Int. Cl.
*H04B 10/12* (2006.01)
(52) U.S. Cl. ............. 359/334; 359/337.12; 359/337.13
(58) Field of Classification Search ........... 359/337.12, 359/337.13, 334
See application file for complete search history.

(56) References Cited

U.S. PATENT DOCUMENTS

| | | | |
|---|---|---|---|
| 6,560,008 B1 * | 5/2003 | Wada ........................ | 359/337 |
| 6,614,586 B1 * | 9/2003 | Hayee et al. ............... | 359/334 |
| 6,741,389 B1 * | 5/2004 | Kumasako et al. ......... | 359/334 |
| 6,760,150 B1 * | 7/2004 | Goto et al. ............. | 359/337.12 |
| 6,947,207 B1 * | 9/2005 | Inoue ........................ | 359/334 |
| 2003/0053194 A1 * | 3/2003 | Hayee et al. ............... | 359/334 |
| 2003/0099030 A1 * | 5/2003 | Kumasako et al. ......... | 359/334 |
| 2003/0169480 A1 * | 9/2003 | Inoue ........................ | 359/334 |

FOREIGN PATENT DOCUMENTS

| | | |
|---|---|---|
| JP | 2001-203414 | 7/2001 |
| JP | 2002-072262 | 3/2002 |
| JP | 2002-084024 | 3/2002 |

OTHER PUBLICATIONS

Sobe et al., Automatic pump power adjustment for gain-flattened multi-wavelength pumped Raman amplifier, Optical Fiber Communication Conference and Exhibit, 2002. OFC 2002. pp. 63-65☐☐ (Mar. 2000) ☐☐.*

* cited by examiner

*Primary Examiner*—Mark Hellner
*Assistant Examiner*—Eric Bolda
(74) *Attorney, Agent, or Firm*—Staas & Halsey LLP

(57) ABSTRACT

Disclosed is a wavelength-division multiplexing optical transmission system in which an optical lossy medium, optical amplifiers and Raman amplifiers for compensating for loss in the optical lossy medium are cascade-connected. The system includes power-level equalizing means for equalizing optical power levels input to an optical amplifier of a succeeding stage by adjusting excitation ratio of a Raman amplifier; optical-SNR equalizing means for adjusting power levels at a transmitting end to equalize optical SNRs at a receiving end; and correction-value acquisition means for acquiring a correction value that represents an amount of change in power of each wavelength before and after optical-SNR equalization control. At control for equalizing power levels by a Raman amplifier, the power-level equalizing means performs equalization control using the correction value that represents the amount of change in power of each wavelength before and after optical-SNR equalization control the previous time, and the optical-SNR equalizing means subsequently performs optical-SNR equalization control.

12 Claims, 16 Drawing Sheets

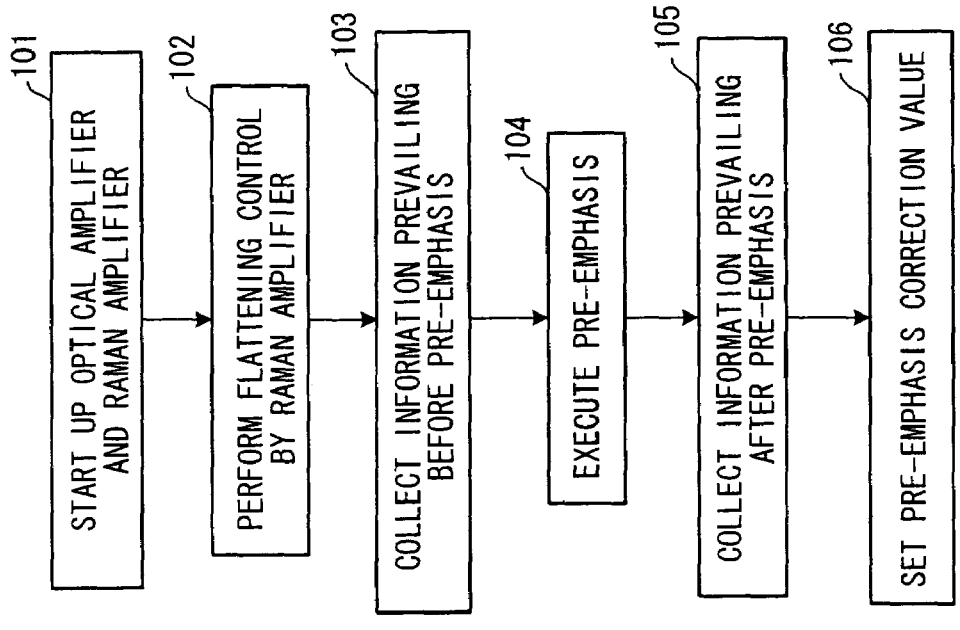
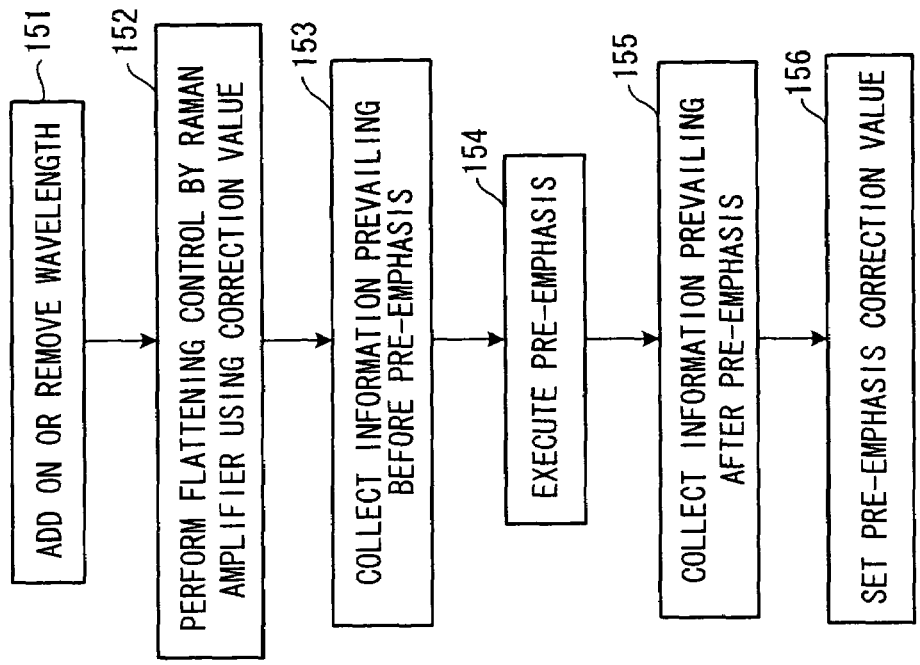

WAVELENGTH-DIVISION MULTIPLEXING OPTICAL TRANSMISSION SYSTEM AND REPEATER STATION THEREIN

BACKGROUND OF THE INVENTION

This invention relates to a wavelength-division multiplexing optical transmission system and repeater station in this system. More particularly, the invention relates to a wavelength-division multiplexing optical communication system and repeater station in which the capacity and transmission distance of an optical transmission system are increased by suppressing interchannel variations (inter-wavelength variations) in received light power, which are caused by wavelength-dependent gain of optical amplifiers and wavelength-dependent loss in the optical fiber of the transmission line.

Interchannel variations (inter-wavelength scattering) in the power of received light in a WDM optical amplifying repeater transmission system are caused by the characteristics and wavelength dependence of an optical lossy medium (optical devices, optical amplifiers and the optical transmission line) through which the wavelength-division multiplexed signal is transmitted, and may be classified into the following components depending upon the cause and characteristics:

1) a slope (primary slope) component caused by the wavelength-dependent loss of the optical transmission line and optical devices and by the Raman effect of the optical transmission line;

2) a beat component (a comparatively gentle rise and fall in the shape of the spectrum) caused by the wavelength-dependent gain of the optical amplifiers; and 3) a ripple component (a deviation on the order of 0.1 to 1 nm) caused by a gain equalizer in the optical amplifiers, an optical device used in an OADM (Optical Add/Drop Multiplexer), etc., a deviation in the output level of the transmitter in each channel and an adjustment error following wavelength-division multiplexing.

Interchannel variations in optical power at the receiving end that are the result of these factors produces variations in optical SNR and, as a result, degrades the transmission characteristic (bit error rate, or BER) and imposes a severe limitation upon the capacity and transmission distance of WDM optical transmission. More specifically, since the wavelength signal of lowest power among the multiplexed wavelength signals is the lower-limit value of receive power after transmission, the maximum transmission distance is limited by the wavelength signal of lowest power. Accordingly, reducing the variation between wavelengths after transmission is critical in terms of enlarging the maximum relay transmission distance.

To achieve this, flattening control and optical pre-emphasis control are available. Flattening control eliminates slope components of the optical spectrum with respect to wavelength (primary slope of the wavelength characteristic) and beat components by changing the excitation ratio of the excitation light of a Raman amplifier. Optical pre-emphasis control equalizes optical SNR (Signal-to-Noise Ratio) at the receiving end by changing the optical output level at the transmitting end channel by channel.

Flattening control by a Raman amplifier seeks to equalize, as much as possible, the input levels to optical amplifiers at the system nodes (optical repeater stations), and the object of pre-emphasis control is to calculate or measure optical SNR of each channel, adjust the output levels at the transmitting end and equalize the optical SNRs at the receiving end. By exercising such control, it is possible to improve the optical SNR characteristic of the overall system and achieve transmission of greater capacity and over longer distances.

FIG. 14 is a diagram useful in describing optical pre-emphasis control (see the specification of Japanese Patent Application Laid-Open No. 2001-203414). A WDM optical signal generated by an optical transmitter 11a in an optical transmitting station 11 is amplified by a plurality of optical repeaters 13a, 13b, . . . 13n, which are provided in optical transmission lines 12, so as to compensate for loss along the optical transmission lines 12 and loss in the optical repeaters 13a, 13b, . . . 13n, the amplified signal is transmitted to an optical receiving station 14 and the signal is received and processed by an optical receiver 14a. Loss in the optical repeaters 13a, 13b, . . . 13n is produced by optical component parts such as a dispersion compensating fiber used in the stations.

When the WDM optical signal is sent from the optical transmitter 11a to the optical transmission lines 12, pre-emphasis is applied by a pre-emphasis control circuit 11b within the optical transmitting station. That is, the pre-emphasis control circuit 11b calculates the difference between an average value of optical SNRs of all channels received from the optical receiving station 14 and the optical SNR of each individual channel and adjusts the optical level of each channel by an optical attenuator 11c so as to compensate for this difference. The optical transmitter 11a wavelength-division multiplexes the adjusted optical signals of all channels and sends the multiplexed signals to the optical transmission lines 12. The optical SNR of the optical signal of each wavelength is measured by an optical-SNR measurement circuit 14b provided in the optical receiving station 14, the information concerning the SNR is transmitted to the optical transmitting station 11 via a line 15 and then the above-described pre-emphasis control is repeated. As a result of the above operation, control is exercised in the optical receiving station 14 so as to uniformalize SNR.

FIG. 15 is a block diagram illustrating flattening control by a Raman amplifier.

A Raman amplifier produces gain in a signal wavelength that has been shifted from the wavelength of the excitation light by the amount of the Raman shift in the amplifying medium, as shown in FIG. 16. The amount of Raman shift and the Raman band are specific to the amplifying medium. Accordingly, if the excitation wavelength is shifted to the long-wavelength side, then the center wavelength of the gain and the gain band will be shifted toward the long-wavelength side by an amount identical with the amount of shift of the excitation wavelength. Further, optical amplification over a wide band is possible, as shown in FIG. 17, by inputting excitation light sources, which have slightly different excitation wavelengths from one another, to the amplifying medium collectively. Further, since gain varies in such a manner that the higher the power of wavelength of the excitation light, the greater the gain, any gain characteristic can be assigned to a Raman amplifier by controlling the power of each excitation wavelength (see the specification of Japanese Patent Application Laid-Open No. 2002-72262).

A plurality of optical signals (WDM signal light) are wavelength-division multiplexed and input to a back-excited Raman amplifying medium 21 from the input side of a Raman amplifier 20. A wavelength-division multiplexer 22 multiplexes excitation light of wavelengths $\lambda p1$ to $\lambda p3$ from excitation light-source blocks 23a, 23b, 23c, respectively, having different center wavelengths, and inputs the multiplexed signal to a combining coupler 24. The latter combines the excitation light of wavelengths $\lambda p1$ to $\lambda p3$ and the wavelength-multiplexed main-signal light, and supplies the combined signal to the Raman amplifying medium 21. A spectrum analyzer 25 detects the spectrum at the input section or output section (the input section in FIG. 15) of an optical amplifier 26 and inputs the detected spectrum to an excitation light controller 27. The latter calculates the slope (tilt) of the wavelength characteristic from the output of the spectrum analyzer 25, calculates the power of each excitation light signal so as to obtain a characteristic that will be the inverse of this wavelength characteristic and inputs the power to the excitation light-source blocks 23a, 23b, 23c. As a result, the excitation light-source blocks 23a, 23b, 23c generate excitation light of the wavelengths $\lambda p1$ to $\lambda p3$ having an intensity (excitation ratio) conforming to the input power, correct the tilt that is generated in the optical transmission line in the interval that undergoes compensation, flattens the wavelength characteristic and inputs the flattened characteristic to the optical amplifier 26.

Interchannel optical power variations and optical SNR deviations at the receiving end are minimized and high-capacity, long-haul transmission is made possible by the compensating scheme described above.

A further technique is to provide optical attenuators, the degree of attenuation of which can be varied, between a plurality of optical amplifiers disposed in an optical transmission line and flatten the wavelength characteristic by these optical attenuators (see the specification of Japanese Patent Application Laid-Open No. 2002-84024).

Flattening control by a Raman amplifier is extremely effective as a method of eliminating slope and beat components of a spectrum beforehand so long as the amount of attenuation applied by the optical attenuator of each channel disposed at the transmitting end in order to carry out optical pre-emphasis control has sufficient margin.

However, whereas the goal of flattening control by a Raman amplifier is to equalize input/output power of optical amplifiers, the goal of optical pre-emphasis is to equalize optical SNR. In view of this fact, it is necessary to consider items ① to ③ below when both types of control are used conjointly.

① If the input spectrum to the optical amplifier at each node is flat, then, theoretically, the optical SNRs at the receiving end should be uniform. However, since a Raman amplifier performs flattening one to several excitation light signals, there is a limit to flattening, beat components cannot be eliminated and neither can ripple components that produce a deviation in level from channel to channel. Consequently, in order to eventually equalize optical SNRs, it is necessary to carry out optical pre-emphasis control after flattening.

② In a case where a wavelength-division multiplexing optical transmission system is introduced, usually such a system is introduced initially starting from a small number of wavelengths even though the system has a large capacity and a function capable of supporting a large number of wavelengths. Flattening control is control that adjusts excitation light so as to flatten the spectrum while observing the results of measurement by a spectrum analyzer at each node. However, it is highly likely that the excitation state which prevails when flattening is performed with a small number of wavelengths at the time of initial system introduction will differ from that which will eventually prevail when flattening is performed after the addition of a large number of wavelengths. In order to exercise optimum flattening control for a number of wavelengths and for every provided wavelength in such a manner that optical pre-emphasis control will be subjected to as little load as possible, it is preferred that flattening control be carried out when wavelengths are added on and when wavelengths are removed.

③ Thus, in order to eventually bring about the optimum state in terms of optical characteristics by pre-emphasis control, it is necessary to perform control in a certain order, namely flattening control first and then optical pre-emphasis control. It should be noted that after wavelengths are added on or removed, it is necessary that flattening control be performed again in order to lighten the load on pre-emphasis control. At such time there is the possibility that the condition of the spectrum that was optimized by pre-emphasis control with regard to the already existing wavelengths will be upset. This is a cause of degradation of the optical signal after the start of service and can lead to error. In order to avoid such a situation, control must be exercised a particular way when flattening control is carried out after wavelengths are added on or removed. Specifically, it is necessary to perform control in such a manner that wavelengths subsequently added on are flattened as much as possible while the spectrum that prevails following the preceding pre-emphasis is maintained. However, such flattening control is not performed by the prior art described in the examples of the patent specifications cited above.

SUMMARY OF THE INVENTION

Accordingly, an object of the present invention is to so arrange it that flattening control after wavelengths are added on or removed is carried out in such a manner that wavelengths added on are flattened as much as possible while the spectrum that prevails following the preceding pre-emphasis is maintained.

According to a first aspect of the present invention, the foregoing object is attained by providing a wavelength-division multiplexing optical transmission system in which an optical lossy medium, optical amplifiers and Raman amplifiers for compensating for loss in the optical lossy medium are cascade-connected, the system comprising: ① power-level equalizing means for equalizing optical power levels input to an optical amplifier of a succeeding stage by adjusting excitation ratio of a Raman amplifier; ② optical-SNR equalizing means for adjusting power levels at a transmitting end to equalize optical SNRs at a receiving end; and ③ correction-value acquisition means for acquiring a correction value that represents an amount of change in power of each wavelength before and after optical-SNR equalization control. At control for equalizing power levels by a Raman amplifier, the power-level equalizing means performs equalization control using the correction value that represents the amount of change in power of each wavelength before and after optical-SNR equalization control the previous time, and the optical-SNR equalizing means subsequently performs optical-SNR equalization control.

For example, assume that the correction-value acquisition means is a monitoring control unit provided at a repeater station. The monitoring control unit ① calculates and retains, as the correction value, the difference in optical power of each wavelength, before and after optical-SNR equalization control, detected by a spectrum analyzer provided in a Raman amplifier and ② at optical-power equalization control, subtracts the correction value from the optical power of each wavelength detected by the spectrum analyzer and inputs the result of subtraction to the Raman amplifier; and ③ the Raman amplifier performs optical-power equalization control based upon the result of subtraction.

According to a second aspect of the present invention, the foregoing object is attained by providing a wavelength-division multiplexing optical transmission system in which an optical lossy medium, optical amplifiers and Raman amplifiers for compensating for loss in the optical lossy medium are cascade-connected, the system comprising: ① power-level equalizing means for equalizing optical power levels input to an optical amplifier of a succeeding stage by adjusting excitation ratio of a Raman amplifier; and ② correction-value acquisition means for acquiring a correction value that represents an amount of change in power of each wavelength before and after optical-SNR equalization control, which is for adjusting power levels at a transmitting end to equalize optical SNRs at a receiving end. At control for equalizing power levels by a Raman amplifier, the power-level equalizing means performs equalization using the correction value that represents the amount of change in power of each wavelength before and after optical-SNR equalization control of the previous time.

For example, the correction-value acquisition means is a monitoring control unit provided at a repeater station. The monitoring control unit ① calculates and retains, as the correction value, the difference in optical power of each wavelength, before and after optical-SNR equalization control, detected by a spectrum analyzer provided in a Raman amplifier and ② at optical-power equalization control, subtracts the correction value from the optical power of each wavelength detected by the spectrum analyzer and inputs the result of subtraction to the Raman amplifier; and ③ the Raman amplifier performs optical-power equalization control based upon the result of subtraction.

In accordance with the wavelength-division multiplexing optical transmission system and repeater according to the present invention, flattening control after wavelengths are added on can be carried out in such a manner that wavelengths added on are flattened as much as possible while the spectrum that prevails following preceding pre-emphasis is maintained.

Other features and advantages of the present invention will be apparent from the following description taken in conjunction with the accompanying drawings.

BRIEF DESCRIPTION OF THE DRAWINGS

FIGS. 1A and 1B are flowcharts of overall processing according to the present invention at the time of initial start-up and when wavelengths are added on or removed;

DESCRIPTION OF THE PREFERRED EMBODIMENTS (A) Overview of the Present Invention

Once the shape of a spectrum has been optimized by performing pre-emphasis control, flattening control (equalization control) is carried out in such a manner that the optimized shape of the spectrum will not be disturbed when wavelengths are added on or removed. In order to achieve this, an effective method is to previously store the amount of change in power level before and after the above-mentioned pre-emphasis control and carry out flattening control using information representing this amount of change when wavelengths are added on or removed.

More specifically, information regarding spectrum shape that prevails after pre-emphasis (i.e., the amount of change in power level) is calculated or measured and then stored for every channel (wavelength). When flattening control is performed by a Raman amplifier at such time that a wavelength is added on or removed, the stored information regarding spectrum shape is subtracted from information (power level) obtained from a spectrum analyzer. This makes it possible to carry out flattening control upon taking into consideration the change in power level that is due to pre-emphasis control.

Figure 2:
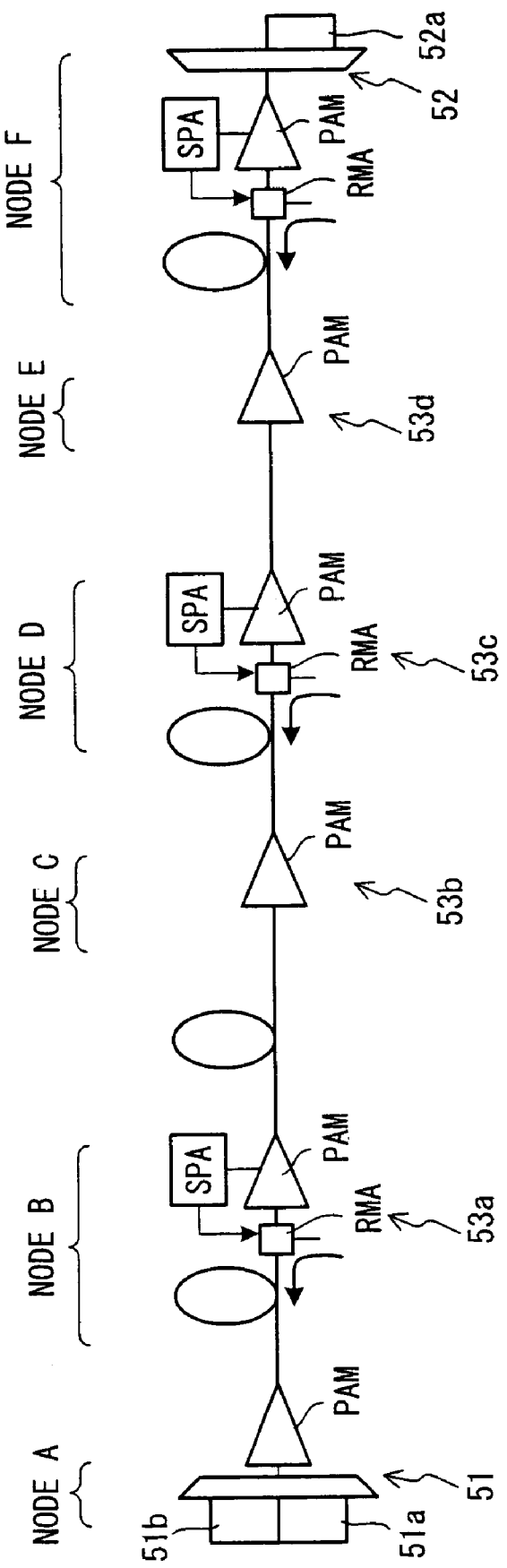
FIG. 2 is a diagram illustrating a wavelength-division multiplexing optical transmission system.
Figure 14:
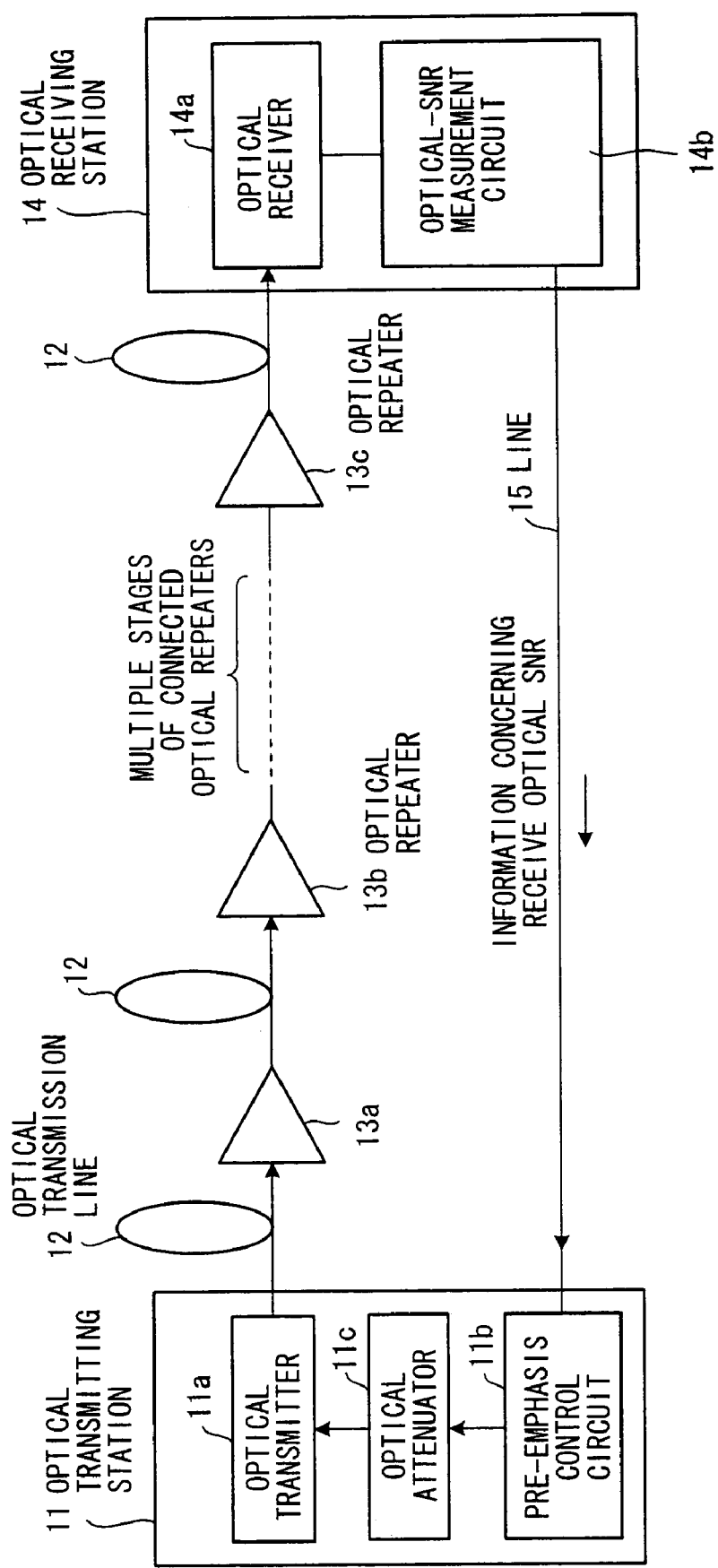
FIG. 14 is a diagram useful in describing optical pre-emphasis control according to the prior art.

(B) Overall Control According to the Present Invention at the Time of Initial Start-up and when Wavelengths are Added on or Removed FIGS. 1A and 1B are flowcharts of overall processing according to the present invention at the time of initial start-up and when wavelengths are added on or removed. As shown for example in FIG. 2, a wavelength-division multiplexing optical system is provided with a number of repeater stations 53a to 53d, which are disposed between a transmitting end 51 and a receiving end 52, for amplifying optical signals and compensating for interchannel variations. If the transmitting end, receiving end and repeater stations are called nodes, then the system will have nodes A to F as illustrated. Node A, which is the transmitting end 51, nodes B to E, which are the repeater stations 53a to 53d, and node F, which is the receiving end 52, are each provided with an optical amplifier PAM. Raman amplifiers RMA and spectrum analyzers SPA are provided where appropriate. Further, the transmitting end 51 is provided with a pre-emphasis control circuit 51a and an optical attenuator 51b having a construction similar to that described in FIG. 14, and the receiving end 52 is provided with an optical-SNR measuring circuit 54b.

At initial start-up control (FIG. 1A), the optical amplifier and Raman amplifier at each node are started up (step 101). After start-up, each spectrum analyzer SPA measures the wavelength characteristic (the power of every wavelength) at the input section or output section of the optical amplifier PAM, and each Raman amplifier performs flattening control using the wavelength characteristic detected by the spectrum analyzer SPA (step 102). Optical pre-emphasis control is performed next. However, in order to observe to what extent spectrum shape is changed by optical pre-emphasis, the Raman amplifier RMA or a monitoring controller (not shown) collects the information that prevailed prior to pre-emphasis control. For example, the Raman amplifier RMA or monitoring controller retains the power of each wavelength before pre-emphasis measured by the spectrum analyzer SPA (step 103).

The transmitting end 51 thenceforth performs pre-emphasis (step 104). After pre-emphasis is executed, the Raman amplifier RMA collects the information that prevails after pre-emphasis. For example, the Raman amplifier RMA retains the wavelength characteristic (the power of each wavelength) measured by the spectrum analyzer SPA (step 105). Further, the Raman amplifier calculates the difference between power D2n of each wavelength after pre-emphasis and power D1n of each wavelength before pre-emphasis and retains this difference as a correction value Dn (step 106). This value is actually used in a case where flattening control by the Raman amplifier is performed at a later date when wavelengths are added on or removed. This ends processing executed at the time of initial start-up. The excitation ratio of the Raman amplifier is thenceforth left unchanged and a constant excitation light continues to be output until a wavelength is added on or removed, etc.

If a wavelength is added on or removed under these conditions (step 151), the Raman amplifier RMA performs flattening control (step 152) using the correction value that was measured or calculated at start-up. More specifically, in regard to the portion of the spectrum that has undergone a shift owing to pre-emphasis, the Raman amplifier RMA applies flattening control to this portion so as to maintain the shape of the spectrum. For example, the Raman amplifier RMA subtracts the retained correction value from the optical power of each wavelength prevailing at the time of flattening control and detected by the spectrum analyzer SPA and performs optical-power equalization control based upon the result of subtraction. As a result, the amount of change in the spectrum due to the adding on or removal of a wavelength is adjusted to achieve a better condition by flattening control.

Next, the state prevailing prior to pre-emphasis control is measured or calculated and retained in a manner similar to that at start-up (step 153). For example, the Raman amplifier RMA retains the power of every wavelength prevailing prior to pre-emphasis and measured by the spectrum analyzer SPA before pre-emphasis control is performed.

This is followed by execution of pre-emphasis at the transmitting end 51 (step 154). After execution of pre-emphasis, the Raman amplifier RMA collects information that prevails following pre-emphasis. For example, the Raman amplifier RMA retains the wavelength characteristic (the power of each wavelength), which prevails after pre-emphasis, measured by the spectrum analyzer SPA (step 155). Further, the Raman amplifier RMA calculates the difference between the power of each wavelength after pre-emphasis and the power of each wavelength before pre-emphasis, adds the difference to the preceding correction value Dn and stores the sum as the new correction value (step 156). This ends processing executed at the time of wavelength add-on or removal. The excitation ratio of the Raman amplifier is thenceforth left unchanged and a constant excitation light continues to be output until the next time a wavelength is added on or removed, etc.

By repeating the above-described operation and control whenever a wavelength is added on or removed, the change in the shape of the spectrum due to pre-emphasis is held and it is possible to carry out control so as to compensate for a change in the shape of the spectrum due to the addition or removal of a wavelength.

(C) Flattening Control According to First Embodiment

Figure 3:
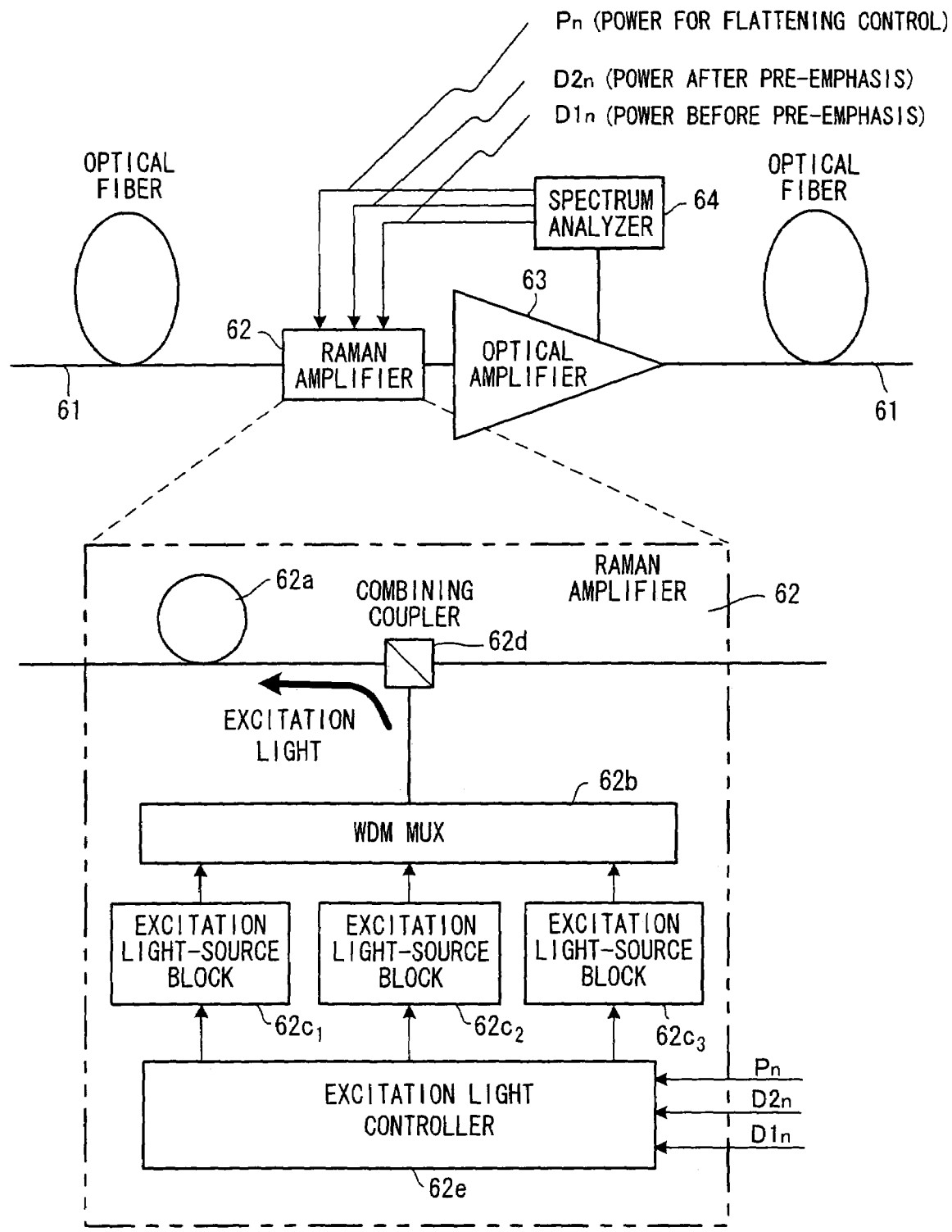
FIG. 3 is a diagram illustrating minimal node structure useful in describing flattening control according to a first embodiment.

FIG. 3 is a diagram illustrating minimal node structure useful in describing flattening control according to a first embodiment. As shown in FIG. 3, the node includes an optical transmission line 61 comprising optical fiber; a Raman amplifier (RMA) 62 for performing flattening control; and a spectrum analyzer (SPA) 64 for detecting power of each wavelength at the input section or input section of the optical amplifier 63.

Figure 15:
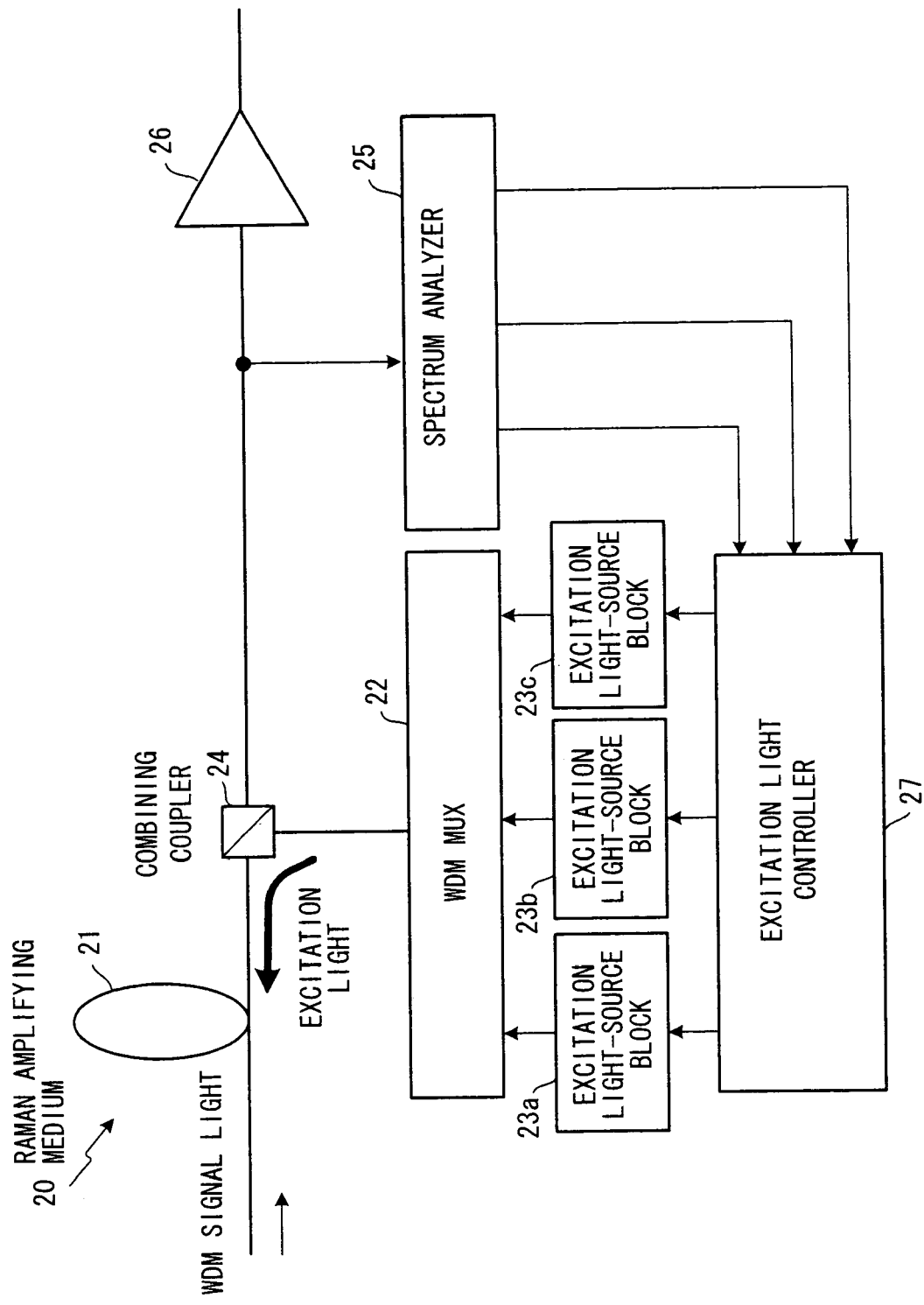
FIG. 15 is a block diagram illustrating flattening control by a Raman amplifier according to the prior art.
Figure 16:
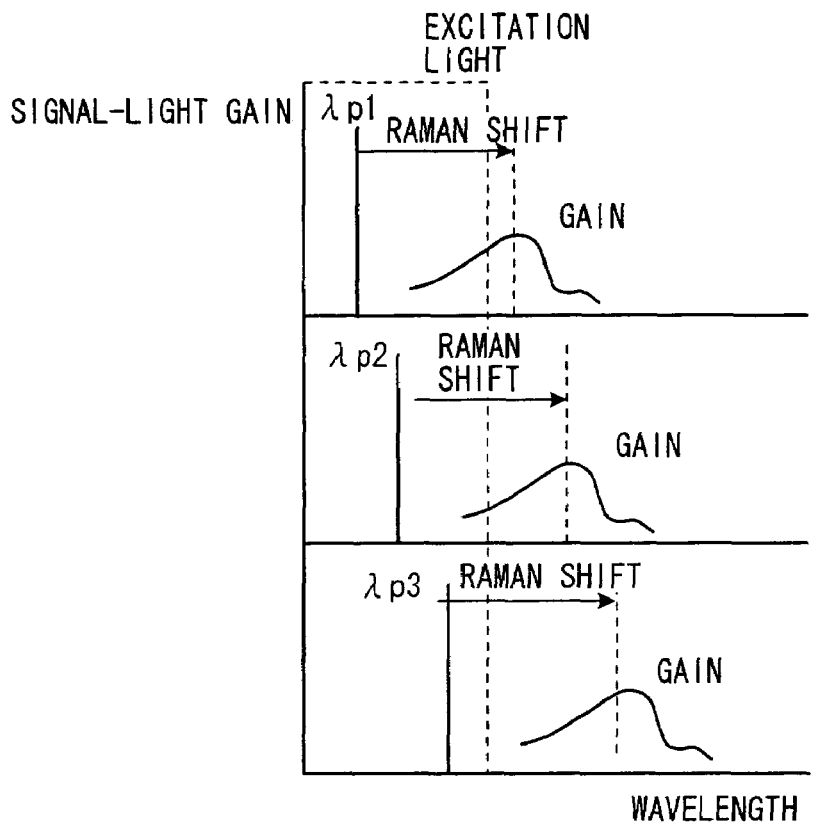
FIG. 16 is a first diagram showing the relationship between excitation wavelength and gain according to the prior art.
Figure 17:
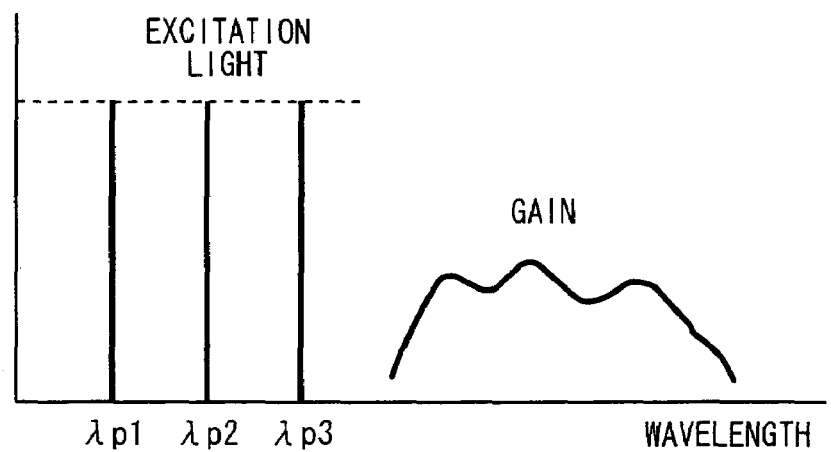
FIG. 17 is a second diagram showing the relationship between excitation wavelength and gain according to the prior art.

The Raman amplifier 62 has a structure similar to that of the prior art shown in FIG. 15. Specifically, WDM signal light is input to a back-excited Raman amplifying medium 62a from the input side of the Raman amplifier 62. A wavelength-division multiplexer 62b multiplexes excitation light of wavelengths $\lambda p1$ to $\lambda p3$ from excitation light-source blocks $62c_1$, $62c_2$, $62c_3$, respectively, having different center wavelengths, and inputs the multiplexed signal to a combining coupler 62d. The latter combines the excitation light of wavelengths $\lambda p1$ to $\lambda p3$ and the WDM signal light, and supplies the combined signal to the Raman amplifying medium 62a.

A spectrum analyzer 64 detects the power of each wavelength at the input section or output section of the optical amplifier 63 and inputs the detected power to an excitation light controller 62e. The latter calculates the slope (tilt) of the wavelength characteristic from the output of the spectrum analyzer 25, calculates the power of each excitation light signal so as to obtain a characteristic that will be the inverse of this wavelength characteristic and inputs the power to the excitation light-source blocks 23a, 23b, 23c. As a result, the excitation light-source blocks $62c_1$, $62c_2$, $62c_3$ generate excitation light of the wavelengths $\lambda p1$ to $\lambda p3$ having an intensity (excitation ratio) conforming to the input power, correct the tilt that is generated in the optical transmission line 61, flattens the wavelength characteristic and inputs the flattened characteristic to the optical amplifier 63.

Figure 4:
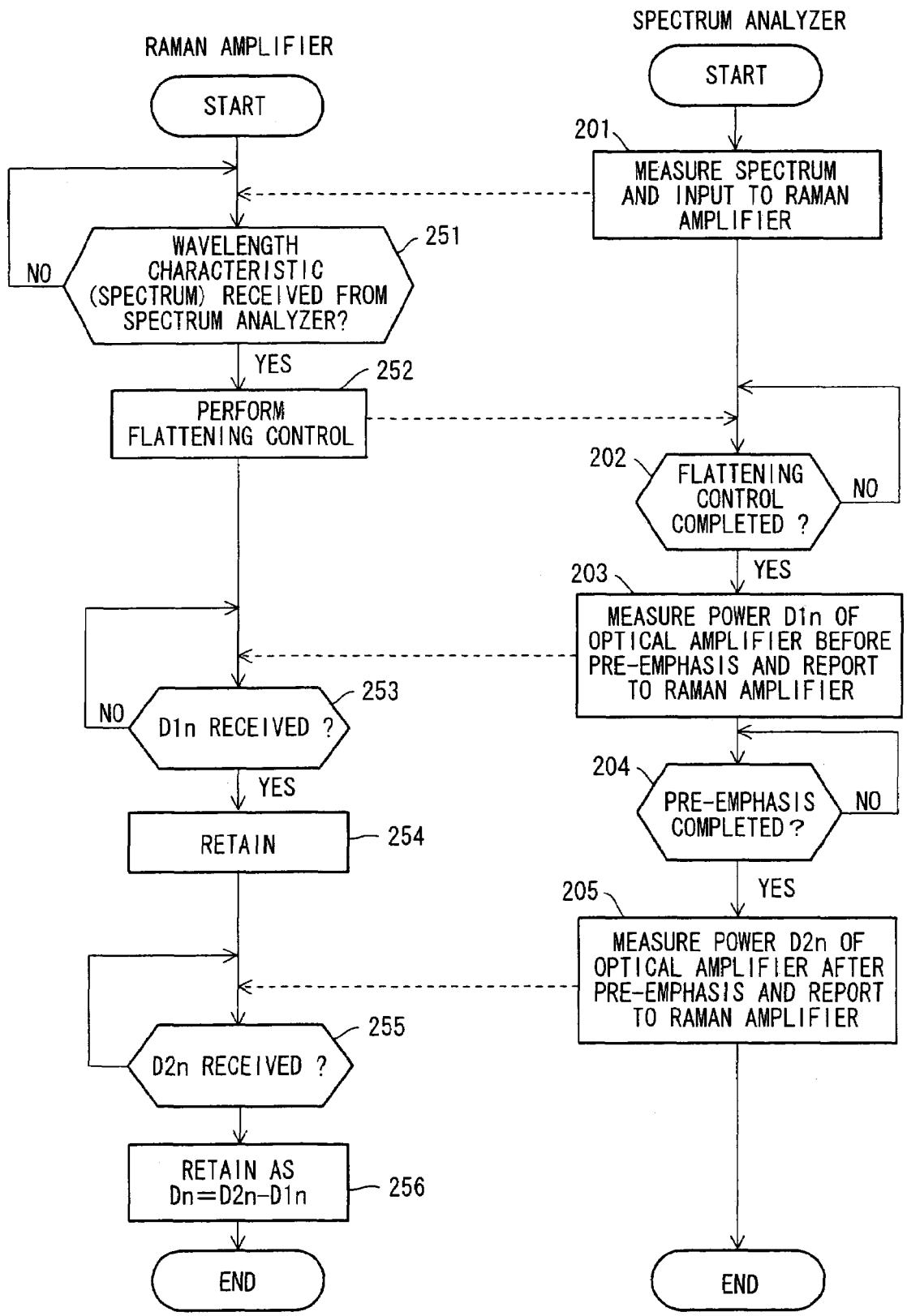
FIG. 4 is a flowchart of processing by a Raman amplifier and spectrum analyzer at the time of initial start-up in the first embodiment.
Figure 5:
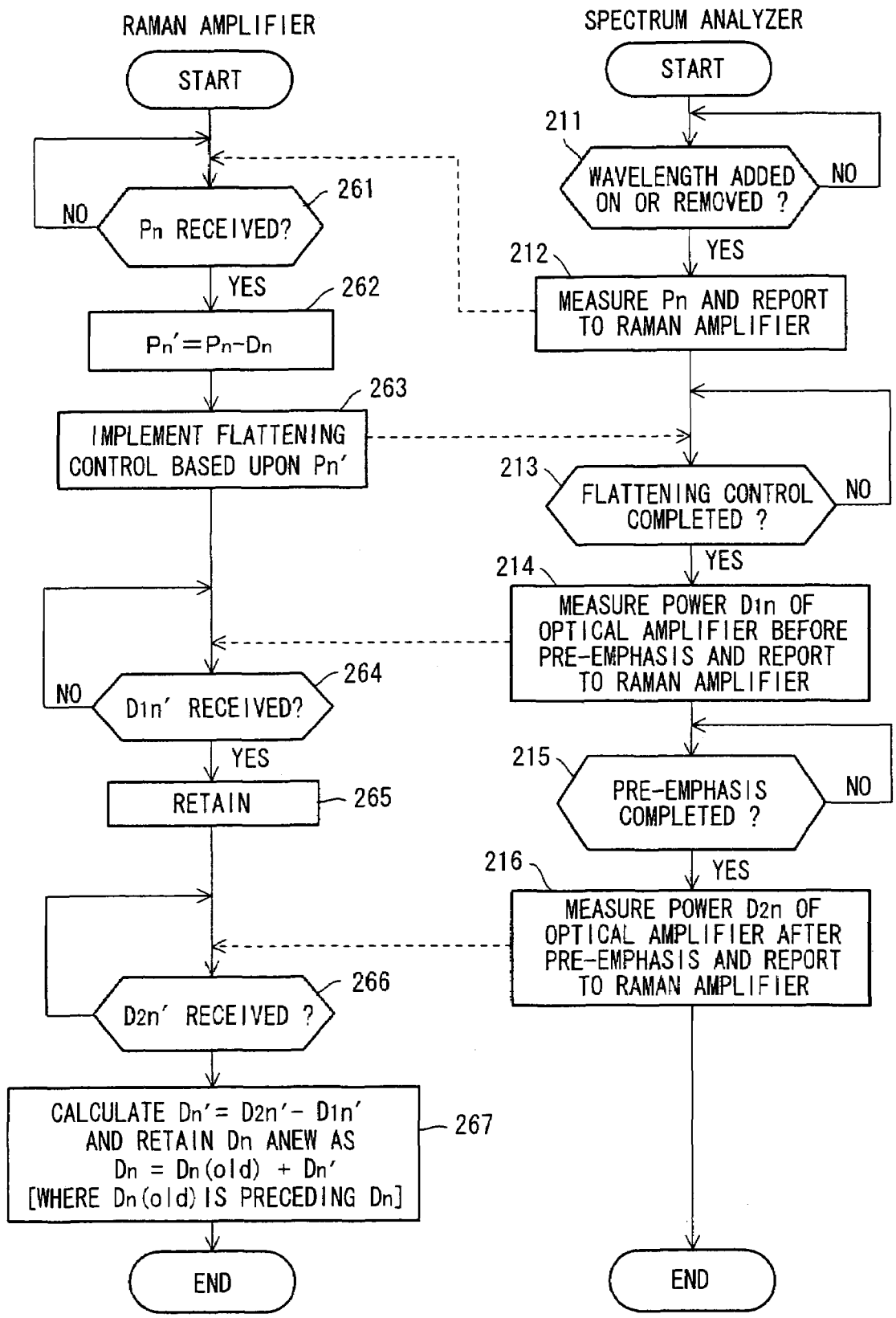
FIG. 5 is a flowchart of processing by a Raman amplifier and spectrum analyzer when wavelengths are added on or removed in the first embodiment.

FIGS. 4 and 5 are flowcharts of processing by a Raman amplifier and spectrum analyzer at the time of initial start-up and when wavelengths are added on or removed, respectively, in the first embodiment. According to the first embodiment, information (the wavelength characteristic) from the spectrum analyzer 64 before and after pre-emphasis is held by the Raman amplifier 62, the latter calculates and stores the difference between the wavelength characteristic before pre-emphasis control and the wavelength characteristic after pre-emphasis as the correction value and performs flattening control using this correction value when a wavelength is added on or removed.

The processing of FIG. 4 is such that after the optical amplifier and Raman amplifier at each node are started up, the spectrum analyzer SPA measures the wavelength characteristic (the power of each wavelength) at the input section or output section of the optical amplifier 63, inputs the wavelength characteristic to the Raman amplifier 62 (step 201) and waits for end of flattening control by the Raman amplifier (step 202).

When the power of each wavelength is received from the spectrum analyzer 64 (step 251), the excitation light controller 62e of the Raman amplifier 62 implements flattening control so as to flatten the wavelength characteristic (step 252) and thenceforth waits for receipt of the power D1$n$ (n=1, 2, 3, . . . ) of each wavelength before pre-emphasis control (step 253). It should be noted that n represents the wavelength number.

When flattening control by the Raman amplifier ends, the spectrum analyzer 64 measures the power D1$n$ (n=1, 2, 3, . . . ) of each wavelength at the input section or output section of the optical amplifier 63 prior to pre-emphasis control, reports this to the Raman amplifier 62 (step 203) and waits for completion of pre-emphasis control (step 204). When pre-emphasis control is completed, the spectrum analyzer 64 measures power D2$n$ at the input section or output section of the optical amplifier 63, reports this to the Raman amplifier 62 (step 205) and terminates control for initial system start-up.

When the power D1$n$ (n=1, 2, 3, . . . ) of each wavelength prior to pre-emphasis is received at step 253, the excitation light controller 62e of the Raman amplifier 62 retains the power (step 254) and then waits for receipt of power D2$n$ (n=1, 2, 3, . . . ) of each wavelength after pre-emphasis control (step 255). When the power D2$n$ (n=1, 2, 3, . . . ) of each wavelength after pre-emphasis control is received, the excitation light controller 62e retains the power (step 256) and terminates control for initial system start-up. It should be noted that the excitation light controller 62e can also calculate the difference D$n$ (=D2$n$–D1$n$) between D2$n$ and D1$n$ and retain this difference as the correction value.

In the processing of FIG. 5, the spectrum analyzer 64 monitors whether a wavelength has been added on or removed (step 211). The excitation light controller 62e of the Raman amplifier monitors whether the power P$n$ (where n represents the wavelength number) of each wavelength at the input section or output section of the optical amplifier has been received from the spectrum analyzer 64 (step 261).

If the spectrum analyzer 64 detects the addition or removal of a wavelength, it measures the power P$n$ of each wavelength at the input section or output section of the optical amplifier 63, reports this to the Raman amplifier 62 (step 212) and waits for end of flattening control by the Raman amplifier (step 213).

If the power P$n$ of each wavelength is received from the spectrum analyzer 64, the excitation light controller 62e of the Raman amplifier calculates power P$n$' of each wavelength (step 262) in accordance with the following equation using the correction value D$n$:

$$P1n'=Pn-Dn=Pn-(D2n-D1n) \quad (1)$$

and performs flattening control using P$n$' (step 263). Thereafter, the excitation light controller 62e waits for receipt of power D1$n$' (n=1, 2, 3, . . . ) of each wavelength prior to pre-emphasis control (step 264).

When flattening control by the Raman amplifier ends, the spectrum analyzer 64 measures power D1$n$' (n=1, 2, 3, . . . ) of each wavelength at the input section or output section of the optical amplifier 63, reports this to the Raman amplifier 62 (step 214) and waits for completion of pre-emphasis control (step 215). If pre-emphasis control is completed, the spectrum analyzer 64 measures power D2$n$' (n=1, 2, 3, . . . ) at the input section or output section of the optical amplifier 63, reports this to the Raman amplifier 62 (step 216) and terminates control for when a wavelength is added on or removed.

If power D1$n$' (n=1, 2, 3, . . . ) of each wavelength prior to pre-emphasis control is received at step 264, the excitation light controller 62e of Raman amplifier 62 retains the power D1$n$' (step 265) and thenceforth waits for receipt of power D2$n$' (n=1, 2, 3, . . . ) of each wavelength after pre-emphasis control (step 266). If the power D2$n$' (n=1, 2, 3, . . . ) of each wavelength after pre-emphasis control is received, the excitation light controller 62e of Raman amplifier 62 retains the power D1$n$' (step 267) and terminates control for when a wavelength is added on or removed. The excitation light controller 62e calculates the difference D$n$' (=D2$n$'–D1$n$') between D2$n$' and D1$n$' and stores the correction value D$n$ of flattening control anew in place of D$n$=D$n$(old)+D$n$', where D$n$(old) represents the preceding correction value D$n$.

(D) Flattening Control According to First Embodiment

Figure 6:
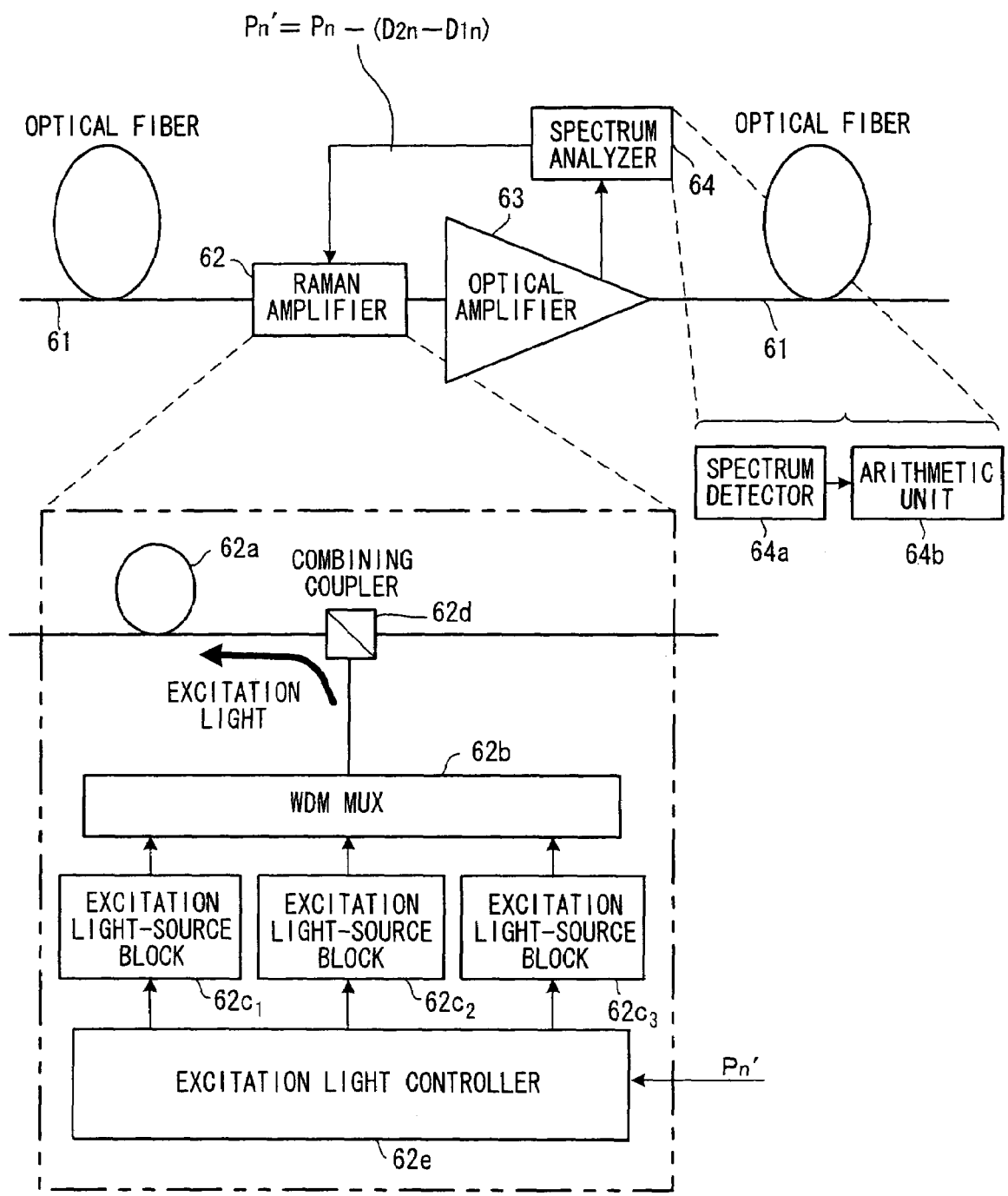
FIG. 6 is a diagram illustrating minimal mode structure useful in describing flattening control according to a second embodiment.

FIG. 6 is a diagram illustrating minimal node structure useful in describing flattening control according to a second embodiment, in which components identical with those of the first embodiment are designated by like reference characters. This embodiment differs in that the spectrum analyzer 64 calculates the power P$n$' of each wavelength in accordance with Equation (1) and inputs the power to the Raman amplifier 62 when a wavelength is added on or removed. Further, the spectrum analyzer 64 has a spectrum detector 64a and an arithmetic unit 64b.

Figure 7:
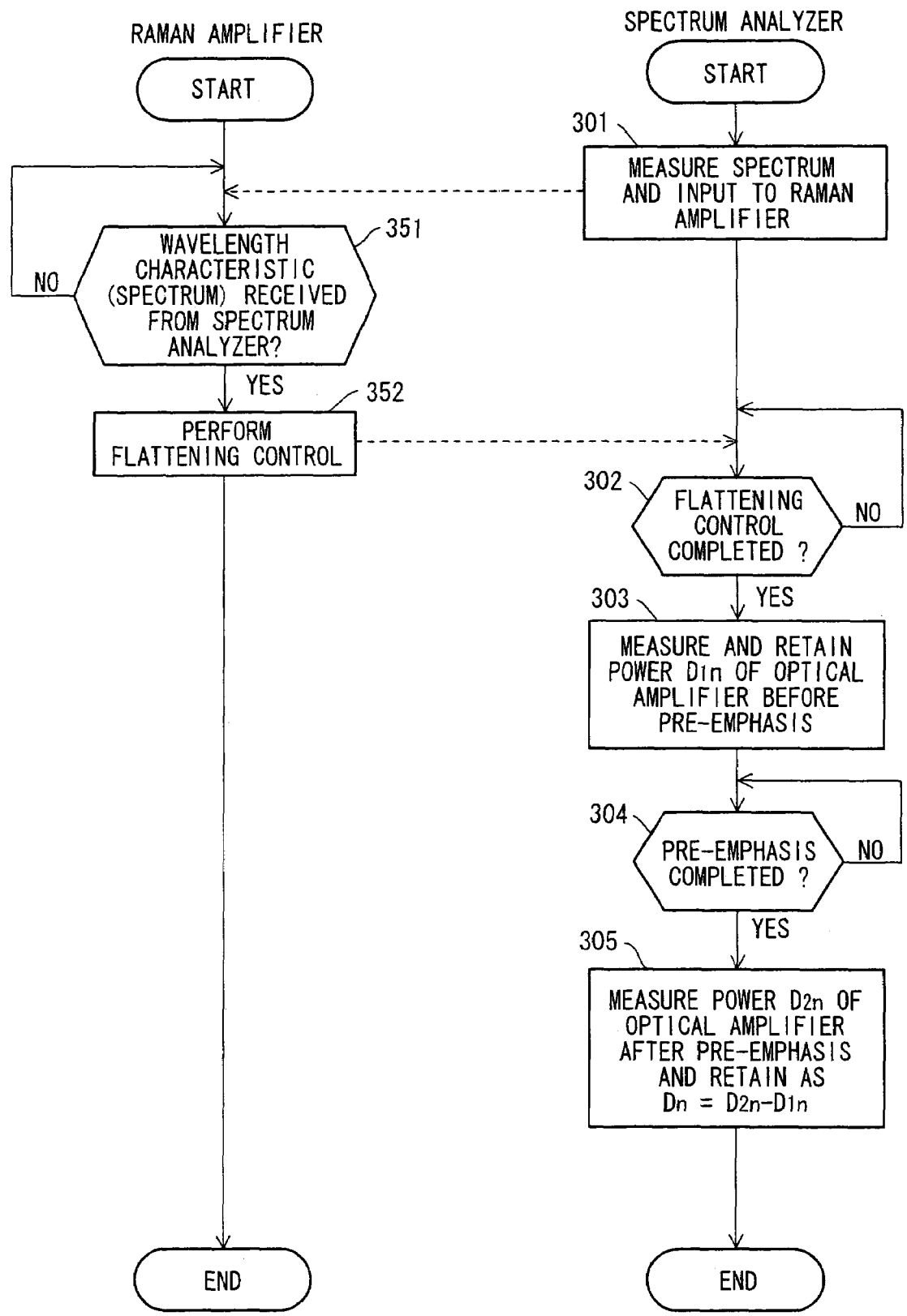
FIG. 7 is a flowchart of processing by a Raman amplifier and spectrum analyzer at the time of initial start-up in the second embodiment.
Figure 8:
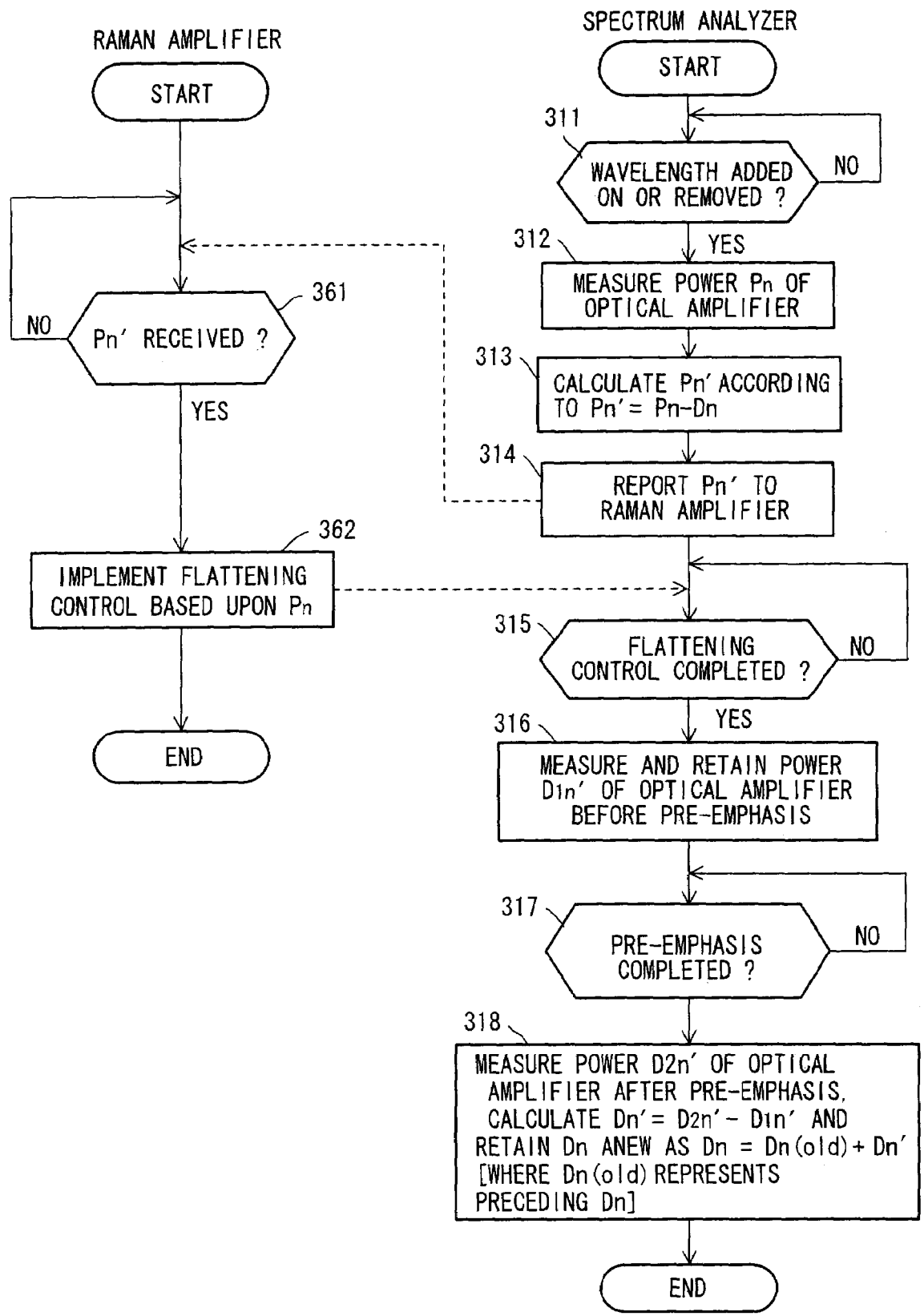
FIG. 8 is a flowchart of processing by a Raman amplifier and spectrum analyzer when wavelengths are added on or removed in the second embodiment.

FIGS. 7 and 8 are flowcharts of processing by a Raman amplifier and spectrum analyzer at the time of initial start-up and when wavelengths are added on or removed, respectively. According to the second embodiment, the wavelength characteristic at the input section or output section of the optical amplifier 63 before pre-emphasis control and the wavelength characteristic after pre-emphasis control are measured and held by the spectrum analyzer 64, the latter performs the calculation of Equation (1) when a wavelength is added on or removed, and inputs the power P$n$' of each wavelength to the spectrum analyzer 64.

The processing of FIG. 7 is such that after the optical amplifier and Raman amplifier at each node are started up, the spectrum analyzer 64 measures the wavelength characteristic (the power of each wavelength) at the input section or output section of the optical amplifier 63, inputs the wavelength characteristic to the Raman amplifier 62 (step 301) and waits for end of flattening control by the Raman amplifier (step 302).

When the power of each wavelength is received from the spectrum analyzer 64 (step 351), the excitation light controller 62e of the Raman amplifier 62 implements flattening control so as to flatten the wavelength characteristic (step 352) and terminates control for initial system start-up.

When flattening control by the Raman amplifier ends, the spectrum analyzer 64 measures and retains the power D1$n$ (n=1, 2, 3, . . . ) of each wavelength at the input section or output section of the optical amplifier 63 prior to pre-emphasis (step 303) and waits for completion of pre-emphasis control (step 304), where n represents the wavelength number.

Next, if pre-emphasis control is completed, the spectrum analyzer 64 measures and retains the power D2$n$ of each wavelength at the input section or output section of the optical amplifier 63 (step 305) and terminates control for initial system start-up. In this case, the arithmetic unit 64$b$ of the spectrum analyzer 64 can also calculate the difference Dn (=D2$n$–D1$n$) between D2$n$ and D1$n$ beforehand and retain this value as the correction value.

In the processing of FIG. 8, the spectrum analyzer 64 monitors whether a wavelength has been added on or removed (step 311). The excitation light controller 62$e$ of the Raman amplifier waits for receipt of the power Pn' of each wavelength from the spectrum analyzer 64 (step 361).

If the spectrum analyzer 64 detects the addition or removal of a wavelength, it measures the power Pn of each wavelength at the input section or output section of the optical amplifier (step 312). Next, the arithmetic unit 64$b$ of the spectrum analyzer 64 calculates the power Pn' of each wavelength in accordance with Equation (1) using the correction value Dn (=D2$n$–D1$n$) (step 313), reports this to the Raman amplifier 62 (step 314) and waits for end of flattening control by the Raman amplifier (step 315).

Upon receiving the power Pn' of each wavelength from the spectrum analyzer 64, the excitation light controller 62$e$ of the Raman amplifier performs flattening control using the value Pn' (step 362) and terminates control for when a wavelength is added on or removed.

When flattening control performed by the Raman amplifier ends, the spectrum analyzer 64 measures and retains the power D1$n$' (n=1, 2, 3, . . . ) of each wavelength at the input section or output section of the optical amplifier 63 (step 316) and waits for completion of pre-emphasis control (step 317). When pre-emphasis control is completed, the spectrum analyzer 64 measures and retains the power D2$n$' of each wavelength at the input section or output section of the optical amplifier 63 (step 318) and terminates control for when a wavelength is added on or removed. The arithmetic unit 64$b$ of the spectrum analyzer 64 calculates the difference Dn' (=D2$n$'–D1$n$') between D2$n$' and D1$n$' and stores the correction value Dn of flattening control anew in place of Dn=Dn(old)+Dn', where Dn(old) represents the preceding correction value Dn.

(E) Flattening Control According to Third Embodiment

Figure 9:
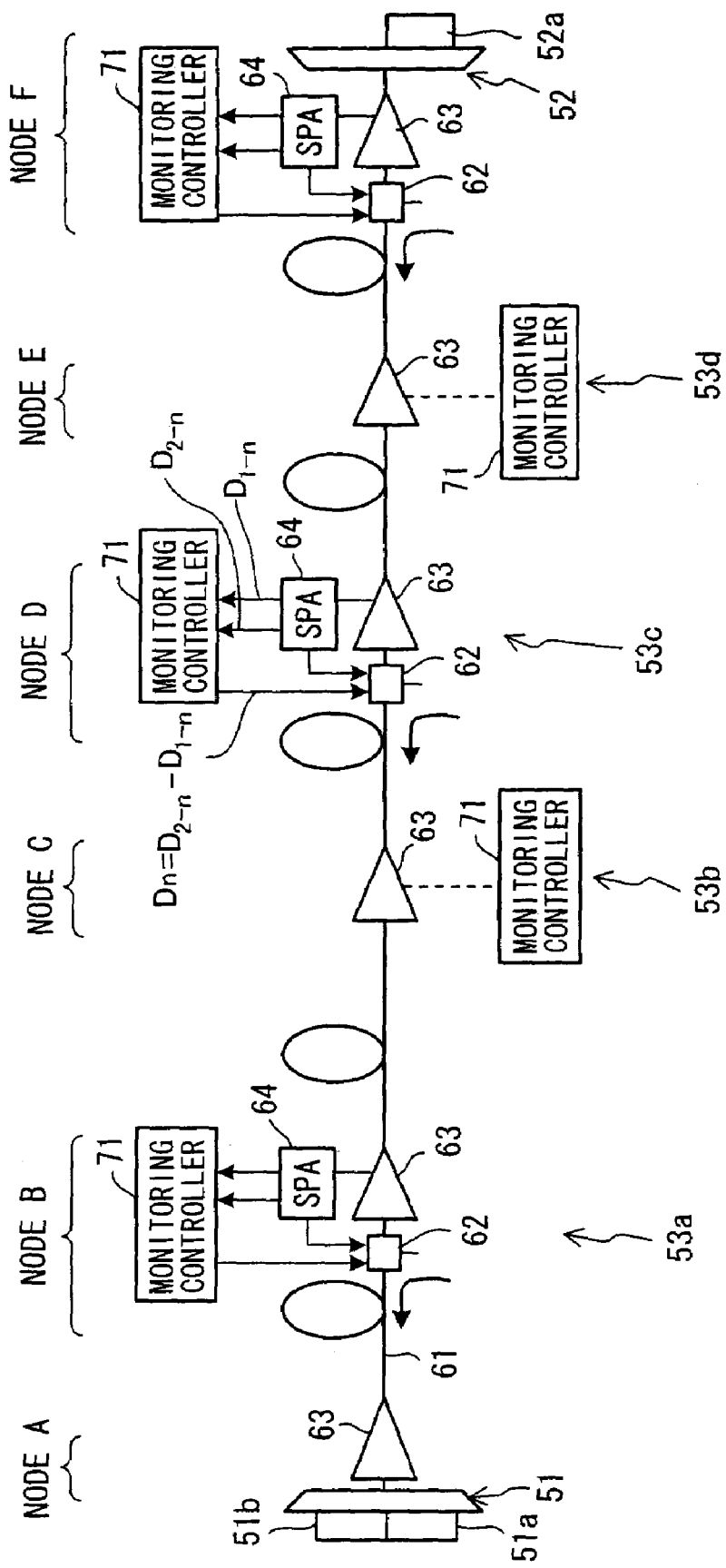
FIG. 9 is a diagram illustrating minimal mode structure useful in describing flattening control according to a third embodiment.

FIG. 9 is a diagram illustrating the configuration of a wavelength-division multiplexing optical transmission system for describing flattening control according to a third embodiment. The wavelength-division multiplexing optical system is provided with the number of repeater stations 53$a$ to 53$d$, which are disposed between the transmitting end 51 and the receiving end 52, for amplifying optical signals and compensating for interchannel variations. Node A, which is the transmitting end 51, nodes B to E, which are the repeater stations 53$a$ to 53$d$, and node F, which is the receiving end 52, are each provided with an optical amplifier 63 and a monitoring controller 71. Raman amplifiers 62 and spectrum analyzers 64 are provided where appropriate. Further, the transmitting end 51 is provided with a pre-emphasis control circuit 51$a$ and an optical attenuator 51$b$ having a construction similar to that described in FIG. 14, and the receiving end 52 is provided with an optical-SNR measuring circuit 54$b$.

Figure 10:
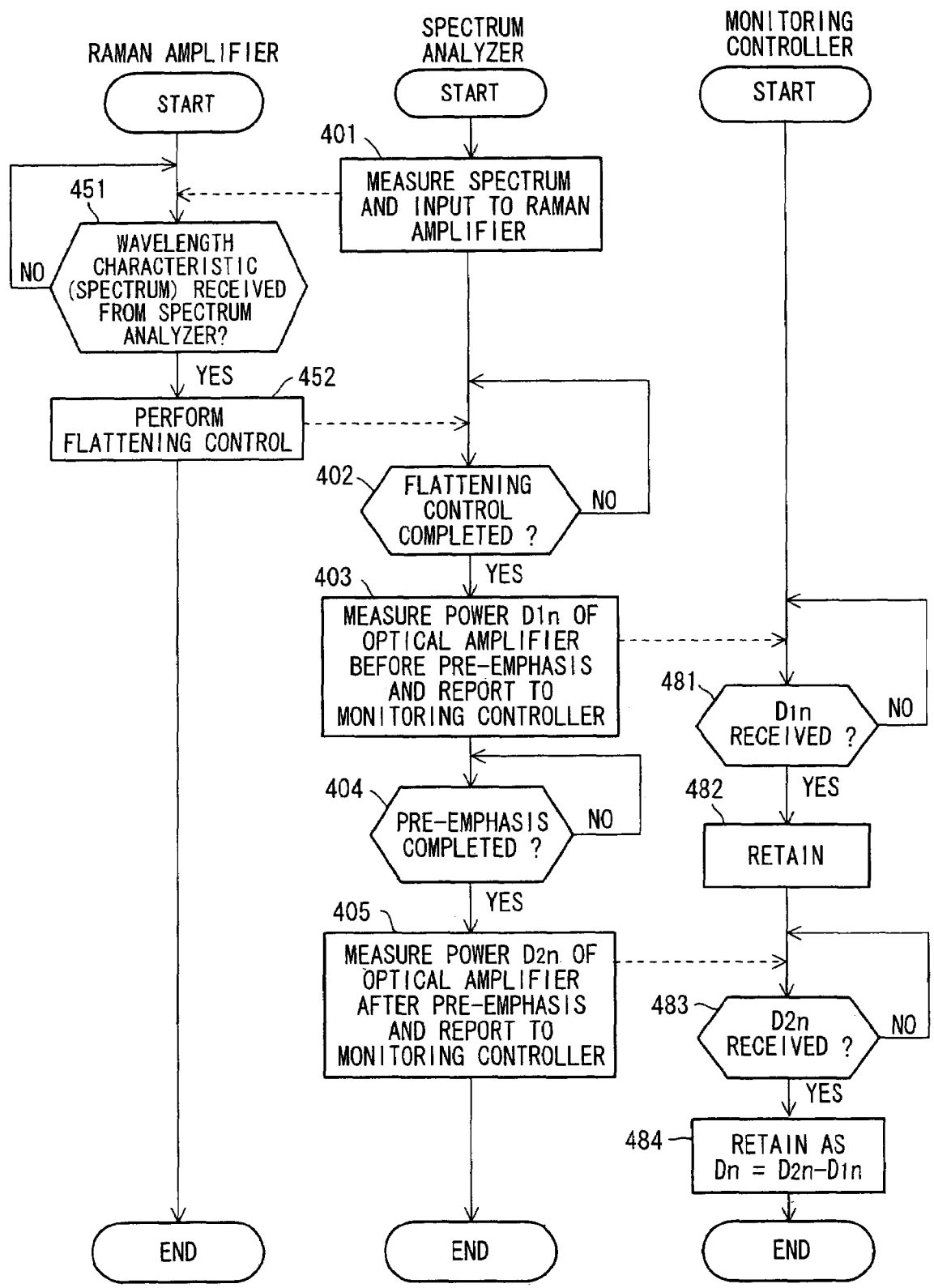
FIG. 10 is a flowchart of processing by a Raman amplifier and spectrum analyzer at the time of initial start-up in the third embodiment.
Figure 11:
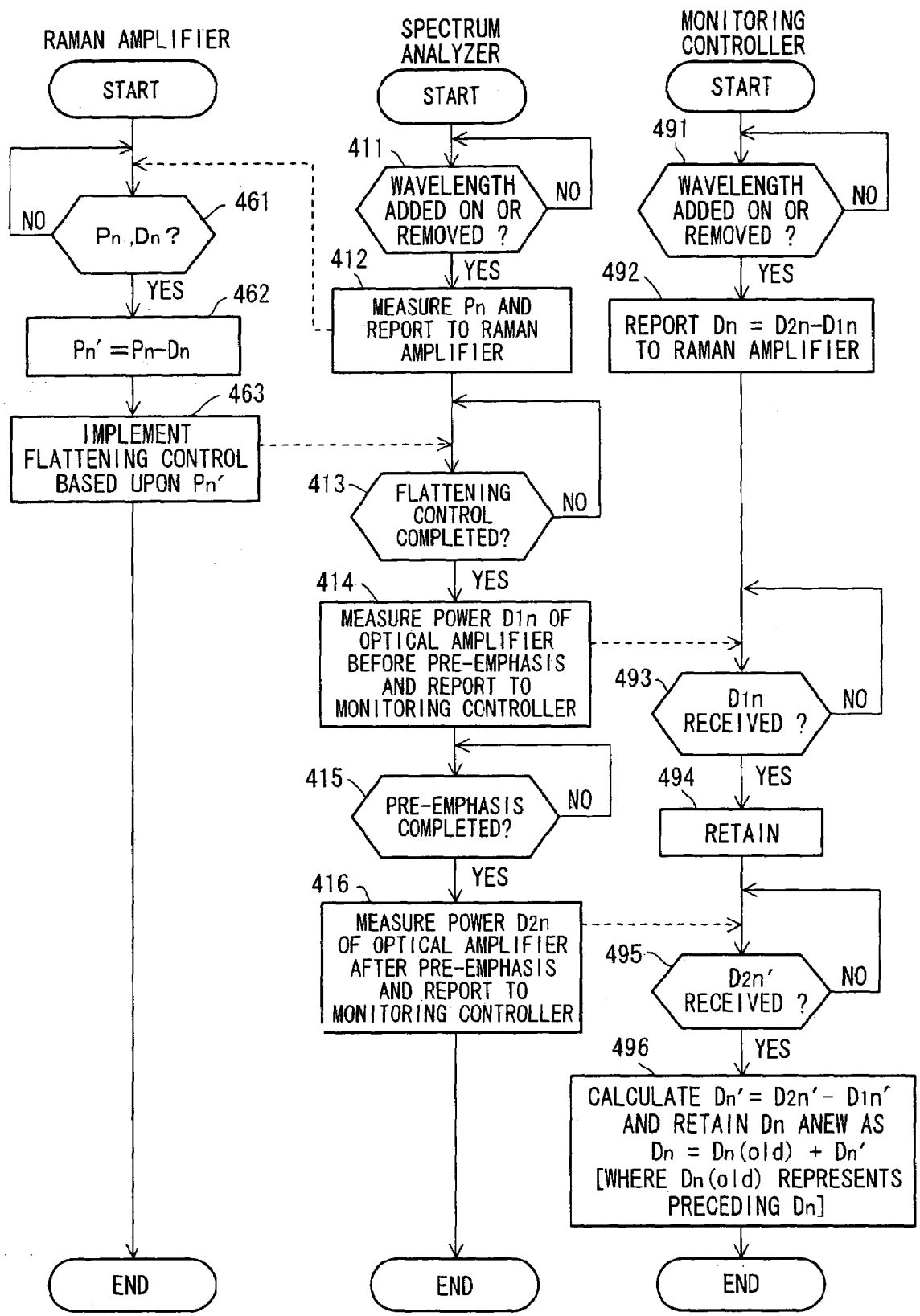
FIG. 11 is a flowchart of processing by a Raman amplifier and spectrum analyzer when wavelengths are added on or removed in the third embodiment.

FIGS. 10 and 11 are flowcharts of processing by a Raman amplifier, spectrum analyzer and monitoring controller at the time of initial start-up and when wavelengths are added on or removed, respectively, in the third embodiment. According to the third embodiment, the wavelength characteristic at the input section or output section of the optical amplifier 63 before pre-emphasis control and that after pre-emphasis control are retained by the monitoring controller 71, the latter calculates the correction value Dn at the time that a wavelength is added on or removed, inputs this value to the spectrum analyzer 64, calculates Pn' in accordance with Equation (1) and executes flattening control.

The processing of FIG. 10 is such that after the optical amplifier and Raman amplifier at each node are started up, the spectrum analyzer 64 measures the wavelength characteristic (the power of each wavelength) at the input section or output section of the optical amplifier 63, inputs the wavelength characteristic to the Raman amplifier 62 (step 401) and waits for end of flattening control by the Raman amplifier (step 402).

When the power of each wavelength is received from the spectrum analyzer 64 (step 451), the Raman amplifier 62 implements flattening control so as to flatten the wavelength characteristic (step 452) and terminates control for initial system start-up.

When flattening control by the Raman amplifier ends, the spectrum analyzer 64 measures the power D1$n$ (n=1, 2, 3, . . . ) of each wavelength at the input section or output section of the optical amplifier 63 prior to pre-emphasis control, reports this to the monitoring controller 71 (step 403) and waits for completion of pre-emphasis control (step 404). It should be noted that n represents the wavelength number. When pre-emphasis control is completed, the spectrum analyzer 64 measures power D2$n$ of each wavelength at the input section or output section of the optical amplifier 63, reports this to the monitoring controller 71 (step 405) and terminates control for initial system start-up.

The monitoring controller 71 waits for receipt of power D1$n$ (n=1, 2, 3, . . . ) of each wavelength before pre-emphasis control (step 481). Upon receiving the power D1$n$ of each wavelength from the spectrum analyzer 64, the monitoring controller 71 retains the power (step 482) and waits for receipt of power D2$n$ (n=1, 2, 3, . . . ) of each wavelength after pre-emphasis control (step 483). Upon receiving the power D2$n$ (n=1, 2, 3, . . . ) of each wavelength after pre-emphasis control, the monitoring controller 71 retains the power (step 484) and terminates control for initial system start-up. It should be noted that the monitoring controller 71 can also calculate the difference Dn (=D2$n$–D1$n$) between D2$n$ and D1$n$ and retain this difference as the correction value.

In the processing of FIG. 11, the spectrum analyzer 64 and monitoring controller 71 monitor whether a wavelength has been added on or removed (steps 411, 491). Further, the Raman amplifier monitors whether the power Pn (where n represents the wavelength number) of each wavelength at the input section or output section of the optical amplifier 63 has been received from the spectrum analyzer 64 and monitors the correction value Dn has been received from the monitoring controller 71 (step 461).

If the spectrum analyzer 64 detects the addition or removal of a wavelength, it measures the power Pn of each wavelength at the input section or output section of the optical amplifier 63, reports this to the Raman amplifier 62 (step 412) and waits for end of flattening control by the Raman amplifier (step 413). Further, if the monitoring controller 71 detects the addition or removal of a wavelength, it calculates the difference Dn (=D2$n$–D1$n$) between the wavelength characteristics D1$n$, D2$n$ prevailing before and after pre-emphasis control as the correction value, reports the correction value to the Raman amplifier 62 (step 492) and waits for receipt of the power D1n (n=1, 2, 3, . . . ) prevailing prior to pre-emphasis control (step 493).

If the Raman amplifier 62 receives the power Pn of each wavelength from the spectrum analyzer 64 and receives the correction value Dn from the monitoring controller 71, the Raman amplifier 62 calculates power Pn' of each wavelength (step 262) in accordance with Equation (1), performs flattening control using the power Pn' (step 463) and terminates control for when a wavelength is added on or removed.

When flattening control by the Raman amplifier 62 ends, the spectrum analyzer 64 measures power D1n' (n=1, 2, 3, . . . ) of each wavelength at the input section or output section of the optical amplifier 63 prevailing prior to pre-emphasis control, reports this to the monitoring controller 71 (step 414) and waits for completion of pre-emphasis control (step 415). If pre-emphasis control is completed, the spectrum analyzer 64 measures power D2n' at the input section or output section of the optical amplifier 63, reports this to the monitoring controller 71 (step 416) and terminates control for when a wavelength is added on or removed.

If the monitoring controller 71 receives power D1n' (n=1, 2, 3, . . . ) of each wavelength before pre-emphasis control (step 481), the monitoring controller 71 retains the power D1n' (step 494) and thenceforth waits for receipt of power D2n' (n=1, 2, 3, . . . ) of each wavelength after pre-emphasis control (step 495). Upon receiving the power D2n' (n=1, 2, 3, . . . ) of each wavelength after pre-emphasis control, the monitoring controller 71 retains the power (step 496) and terminates control for when a wavelength is added on or removed. The monitoring controller 71 calculates the difference Dn' (=D2n'−D1n') between D2n' and D1n' and stores the correction value Dn of flattening control anew in place of Dn=Dn(old)+Dn', where Dn(old) represents the preceding correction value Dn.

(F) Flattening Control According to Fourth Embodiment

Figure 12:
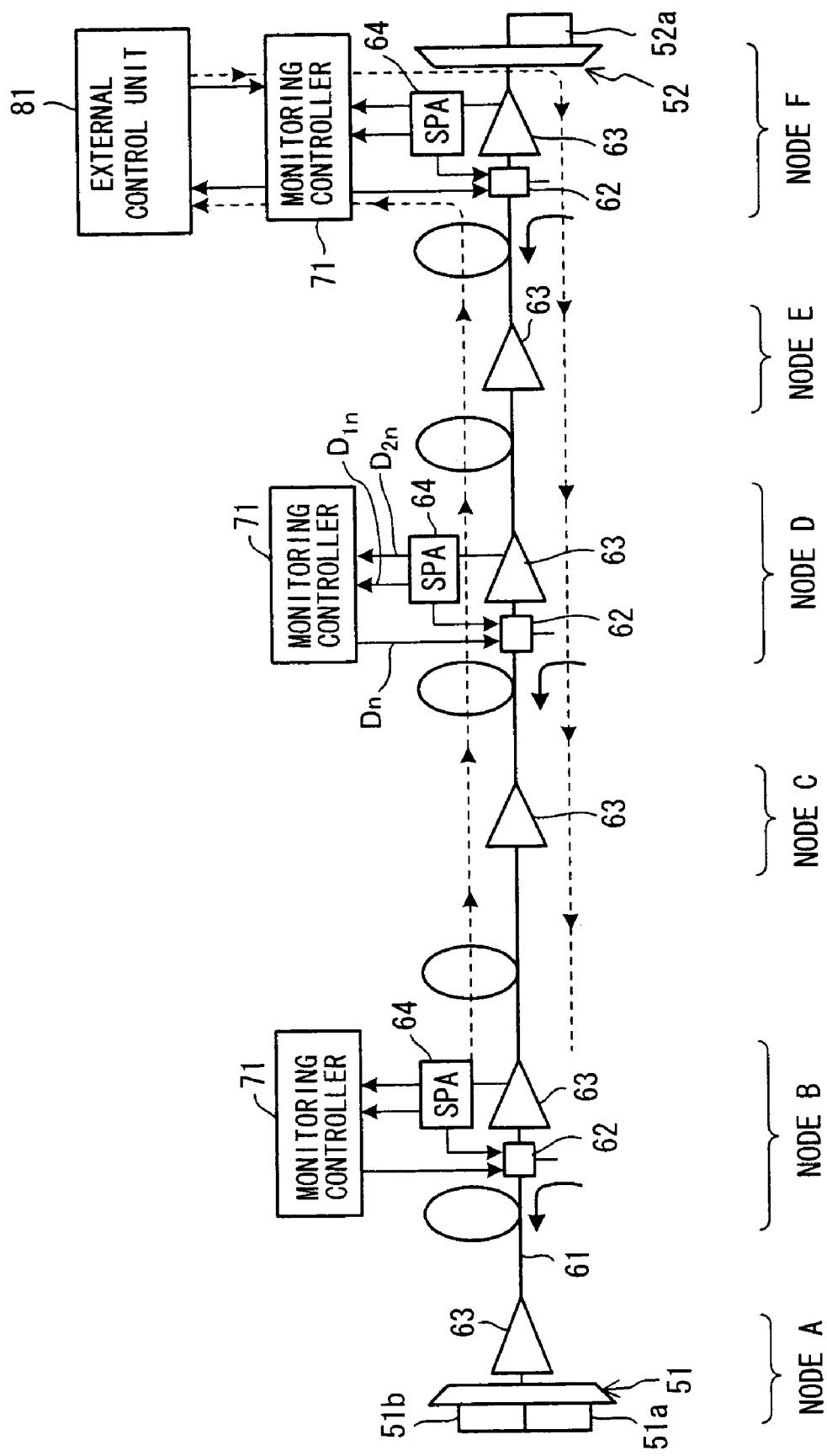
FIG. 12 is a diagram illustrating minimal mode structure useful in describing flattening control according to a fourth embodiment.

FIG. 12 is a diagram illustrating the configuration of a wavelength-division multiplexing optical transmission system for describing flattening control according to a fourth embodiment. Components identical with those of the wavelength-division multiplexing optical transmission system of FIG. 9 are designated by like reference characters. This embodiment differs from the system of FIG. 9 in that whereas the third embodiment uses the monitoring controller to calculate the correction value Dn, the fourth embodiment is provided with an external control unit 81, the latter calculates the correction value Dn and transmits this to the Raman amplifier 62 of each node.

Figure 13:
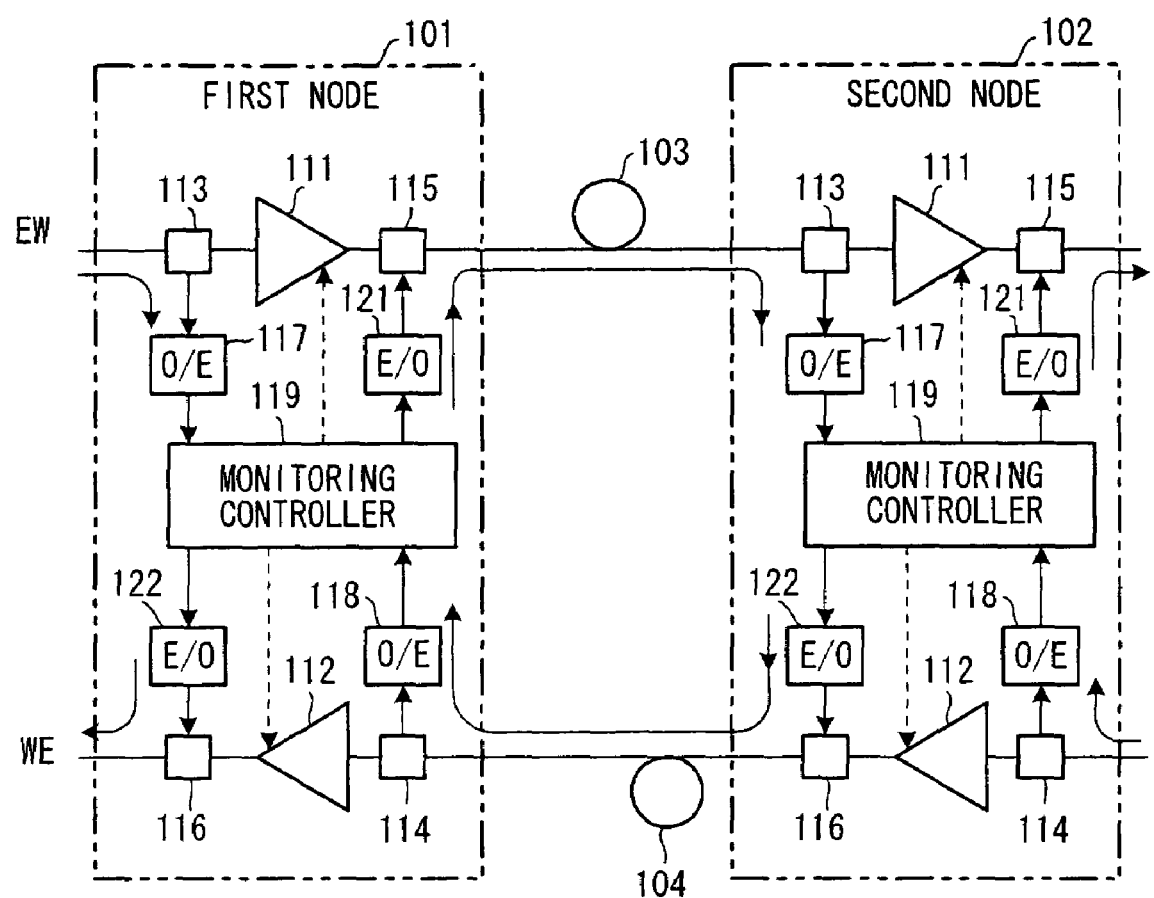
FIG. 13 is a diagram useful in describing sending and receiving of a monitoring control signal between nodes.

The external control unit 81, which is constituted by a personal computer, is connected to the monitoring controller 71 at node F and is capable of sending and receiving a monitoring control signal to and from each node via the monitoring controller and up/down links. FIG. 13 is a diagram useful in describing the sending and receiving of the monitoring control signal between nodes.

Neighboring first and second nodes 101, 102, respectively, are connected by an EW-side link (uplink) 103 and a WE-side link (downlink) 104. Each node is provided with uplink and downlink optical amplifiers 111, 112, respectively, branchers 113, 114 are provided on the input sides of the optical amplifiers 111, 112, respectively, and combiners 115, 116 are provided on the output sides of the optical amplifiers 111, 112, respectively. The branchers 113, 114 branch off light of a wavelength assigned to the monitoring control signal and input the light of this wavelength to a monitoring controller (MNT) 119 via O/E (optoelectronic) transducers 117, 118, respectively. The monitoring controller 119 performs control to extract the correction value Dn, which is contained in the received monitoring control signal, and to input Dn to the Raman amplifier 62, controls implementation/non-implementation of slope correction by the optical amplifiers 111, 112, and carries out other control as well. Further, the monitoring controller 119 receives the power values D1n, D2n of the optical amplifier prevailing before and after pre-emphasis control from the spectrum analyzer 64 and inputs these to E/O (electro-optic) transducers 121, 122 as the monitoring control signal. The E/O transducers 121, 122 convert the monitoring control signal to light of a prescribed wavelength, the combiners 115, 116 combine the WDM main-signal light and the light of the monitoring control signal and transmit the result to the neighboring node. Though Raman amplifiers and spectrum analyzers are not shown in FIG. 13, they are inserted appropriately between the branchers 113, 114 and optical amplifiers 111, 112.

In FIG. 12, the monitoring controller 71 of each node reports the power data D1n, D2n prevailing before and after pre-emphasis control to the external control unit 81 by way of the monitoring control signal. The external control unit 81 uses the power data D1n, D2n, which has been received from the monitoring controller 71 of each node, to calculate the correction value Dn of each and every node, and stores the correction value Dn calculated.

When a wavelength is added on or removed, the external control unit 81 uses the monitoring control signal to report the correction value Dn of the Raman amplifier 62 of each node to the Raman amplifier via the monitoring controller 71. In optical-power equalization control at addition or removal of a wavelength, the Raman amplifier 62 control optical power equalization using the value Pn', which is the result of subtracting the received correction value Dn from the power Pn of the optical amplifier 63.

(G) Modification

In the above embodiments, the correction value Dn is calculated based upon optical power at the input section or output section of the optical amplifier 63. However, it can be so arranged that the correction value is acquired based upon the difference between amount of optical power attenuation of each wavelength at the transmitting end before optical-SNR equalization control and amount of optical power attenuation of each wavelength at the transmitting end after optical-SNR equalization control. In this case, the amount of optical power attenuation of each wavelength would be reported to the Raman amplifier at each node using the monitoring control signal.

In accordance with the wavelength-division multiplexing optical transmission system and repeater station according to the present invention, flattening control after wavelengths are added on or removed can be carried out in such a manner that wavelengths added on are flattened as much as possible while the spectrum that prevails following the preceding pre-emphasis is maintained.

Further, in accordance with the present invention, it can be so arranged that optical pre-emphasis control is performed after flattening, and therefore optical pre-emphasis control is not subjected to excessive load.

Further, in accordance with the present invention, a monitoring controller or external control unit can be made to exercise control to calculate and retain correction values, thereby alleviating load upon the Raman amplifiers.

As many apparently widely different embodiments of the present invention can be made without departing from the spirit and scope thereof, it is to be understood that the invention is not limited to the specific embodiments thereof except as defined in the appended claims.

What is claimed is:

1. A wavelength-division multiplexing optical transmission system in which an optical lossy medium, optical amplifiers and Raman amplifiers for compensating for loss in the optical lossy medium are cascade-connected, said system comprising:
power-level equalizing means for equalizing optical power levels input to an optical amplifier of a succeeding stage by adjusting excitation ratio of a Raman amplifier;
optical-SNR equalizing means for adjusting power levels at a transmitting end to equalize optical SNRs at a receiving end; and
correction-value acquisition means for acquiring a correction value that represents an amount of change in power of each wavelength before and after optical-SNR equalization control;
wherein at control for equalizing power levels by a Raman amplifier, said power-level equalizing means performs equalization control using the correction value that represents the amount of change in power of each wavelength before and after optical-SNR equalization control of the previous time, and said optical-SNR equalizing means subsequently performs optical-SNR equalization control.

2. The system according to claim 1, wherein said correction-value acquisition means calculates, as the correction value, a difference between optical power of each wavelength, which has been detected by a spectral analyzer, before and after optical-SNR equalization control.

3. The system according to claim 1, wherein said optical-SNR equalizing means has a variable optical attenuator used in optical-SNR equalization control; and
said correction-value acquisition means acquires the correction value based upon a difference between amount of optical power attenuation of each wavelength at a transmitting end before optical-SNR equalization control and amount of optical power attenuation of each wavelength at a transmitting end after optical-SNR equalization control.

4. The system according to claim 2, wherein said correction-value acquisition means is provided on the side of a Raman amplifier;
said correction-value acquisition means subtracts the correction value from the optical power of each wavelength detected by an spectral analyzer at the time of optical-power equalization control; and
said Raman amplifier performs optical-power equalization control based upon result of subtraction by said correction-value acquisition means.

5. The system according to claim 2, wherein said correction-value acquisition means is provided on the side of a spectral analyzer;
said correction-value acquisition means subtracts the correction value from the optical power of each wavelength detected by the spectral analyzer at the time of optical-power equalization control and inputs result of subtraction to the Raman amplifier; and
said Raman amplifier performs optical-power equalization control based upon result of subtraction by said correction-value acquisition means.

6. The system according to claim 1, wherein said correction-value acquisition means is a monitoring control unit provided in a repeater station; and
said monitoring control unit calculates, as the correction value, a difference between optical power of each wavelength, which has been detected by a spectral analyzer provided in a Raman amplifier, before and after optical-SNR equalization control and, when optical-power equalization control is performed, subtracts the correction value from the optical power of each wavelength detected by said spectral analyzer and inputs result of subtraction to the Raman amplifier; and
said Raman amplifier performs optical-power equalization control based upon result of subtraction by said monitoring control unit.

7. The system according to claim 1, further comprising an external control unit capable of sending and receiving a monitoring control signal to and from each repeater station;
wherein said external control unit calculates the correction value upon having optical-power data prevailing before and after optical-SNR equalization control input thereto and, when optical-power equalization control is performed by a Raman amplifier, sends the correction value to the Raman amplifier using the monitoring control signal; and
the Raman amplifier performs optical-power equalization control using a value that is the result of subtracting the correction value from the optical-power data at the time of optical-power equalization control.

8. A repeater station in a wavelength-division multiplexing optical transmission system in which an optical lossy medium, optical amplifiers and Raman amplifiers for compensating for loss in the optical lossy medium are cascade-connected, comprising:
power-level equalizing means for equalizing optical power levels input to an optical amplifier of a succeeding stage by adjusting excitation ratio of a Raman amplifier; and
correction-value acquisition means for acquiring a correction value that represents an amount of change in power of each wavelength before and after optical-SNR equalization control performed at a transmitting end in order to equalize optical SNRs at a receiving end;
wherein when power-level equalization control is performed by a Raman amplifier, said power-level equalization means performs equalization using the correction value acquired in optical-SNR equalization control of the previous time.

9. The repeater station according to claim 8, wherein said correction-value acquisition means calculates, as the correction value, a difference between optical power of each wavelength, which has been detected by a spectral analyzer, before and after optical-SNR equalization control.

10. The repeater station according to claim 9, wherein said correction-value acquisition means is provided on the side of a Raman amplifier;
said correction-value acquisition means subtracts the correction value from the optical power of each wavelength detected by an spectral analyzer at the time of optical-power equalization control; and
said Raman amplifier performs optical-power equalization control based upon result of subtraction by said correction-value acquisition means.

11. The repeater station according to claim 9, wherein said correction-value acquisition means is provided on the side of a spectral analyzer;
said correction-value acquisition means subtracts the correction value from the optical power of each wavelength detected by the spectral analyzer at the time of optical-power equalization control and input result of subtraction to the Raman amplifier; and said Raman amplifier performs optical-power equalization control based upon result of subtraction by said correction-value acquisition means.

12. The repeater station according to claim 8, wherein said correction-value acquisition means is a monitoring control unit provided; and said monitoring control unit calculates, as the correction value, a difference between optical power of each wavelength, which has been detected by a spectral analyzer provided in a Raman amplifier, before and after optical-SNR equalization control and, when optical-power equalization control is performed, subtracts the correction value from the optical power of each wavelength detected by said spectral analyzer and inputs result of subtraction to the Raman amplifier; and said Raman amplifier performs optical-power equalization control based upon result of subtraction by said monitoring control unit.

* * * * *

UNITED STATES PATENT AND TRADEMARK OFFICE
CERTIFICATE OF CORRECTION

PATENT NO. : 7,006,278 B2
APPLICATION NO. : 10/689749
DATED : February 28, 2006
INVENTOR(S) : Takeshi Sakamoto et al.

It is certified that error appears in the above-identified patent and that said Letters Patent is hereby corrected as shown below:

On the title page, item (56) References Cited, Other Publications, Column 2, line 4, change "2002." to --2002,--

On the title page, Item (56) References Cited, Other Publications, Column 2, line 4, change "(Mar.2000)" to --(Mar. 2002)--

Signed and Sealed this

Eighth Day of August, 2006

JON W. DUDAS
*Director of the United States Patent and Trademark Office*